(12) United States Patent
Choi et al.

(10) Patent No.: US 10,055,115 B2
(45) Date of Patent: Aug. 21, 2018

(54) ELECTRONIC DEVICE AND METHOD FOR CONTROLLING MULTI-WINDOWS IN THE ELECTRONIC DEVICE

(71) Applicant: Samsung Electronics Co., Ltd., Gyeonggi-do (KR)

(72) Inventors: Bo-Kun Choi, Seoul (KR); Ki-Dong Hong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 180 days.

(21) Appl. No.: 14/287,608

(22) Filed: May 27, 2014

(65) Prior Publication Data

US 2015/0012854 A1    Jan. 8, 2015

(30) Foreign Application Priority Data

Jul. 2, 2013 (KR) .................. 10-2013-0077190

(51) Int. Cl.
*G06F 3/14* (2006.01)
*G06F 3/0488* (2013.01)
*G06F 3/0481* (2013.01)
*G06F 3/0484* (2013.01)

(52) U.S. Cl.
CPC .......... *G06F 3/0488* (2013.01); *G06F 3/0481* (2013.01); *G06F 3/04845* (2013.01); *G06F 3/04883* (2013.01); *G06F 3/04886* (2013.01); *G06F 2203/04803* (2013.01); *G06F 2203/04808* (2013.01)

(58) Field of Classification Search
CPC ................................... G06F 3/14; G06F 3/17
USPC .............. 715/765, 719, 727, 782, 788, 781; 345/173, 649, 1.3, 214
See application file for complete search history.

(56) References Cited

U.S. PATENT DOCUMENTS

| | | | |
|---|---|---|---|
| 7,599,044 B2 | 10/2009 | Hotelling et al. | |
| 2005/0010876 A1* | 1/2005 | Robertson | G06F 3/0481 715/782 |
| 2006/0183545 A1 | 8/2006 | Jourdian et al. | |
| 2008/0204424 A1* | 8/2008 | Jin | G06F 3/0482 345/173 |
| 2009/0231281 A1 | 9/2009 | Whytock et al. | |

(Continued)

FOREIGN PATENT DOCUMENTS

| | | |
|---|---|---|
| CN | 103116437 A | 5/2013 |
| CN | 104081345 A | 10/2014 |

(Continued)

OTHER PUBLICATIONS

European Search Report, dated Jan. 16, 2017.
European Search Report dated May 8, 2017.
Chinese Search Report dated Jan. 22, 2018.

*Primary Examiner* — Ruay Ho
(74) *Attorney, Agent, or Firm* — Cha & Reiter, LLC.

(57) ABSTRACT

An electronic device includes a controller and a display unit having a display screen configured for displaying an output of multi-windows on which executions of a plurality of applications are displayed. When rotation of the electronic device is detected, if frame rotation information of the multi-windows are different from each other, the controller controls a rotation of the frames of the multi-windows such that the frame rotation information respectively set for the multi-windows are maintained.

16 Claims, 26 Drawing Sheets

(56) References Cited

U.S. PATENT DOCUMENTS

| | | |
|---|---|---|
| 2010/0020025 A1 | 1/2010 | Lemort et al. |
| 2010/0164940 A1* | 7/2010 | Jang ................... G09G 3/3614 |
| | | 345/214 |
| 2010/0194703 A1 | 8/2010 | Fedor et al. |
| 2010/0259515 A1 | 10/2010 | Kohara |
| 2011/0317872 A1 | 12/2011 | Free |
| 2012/0054674 A1* | 3/2012 | Beykpour ............. G06F 3/0481 |
| | | 715/788 |
| 2012/0266101 A1* | 10/2012 | Shah ................... G06F 9/4443 |
| | | 715/781 |
| 2012/0278031 A1 | 11/2012 | Oda et al. |
| 2013/0021376 A1* | 1/2013 | Satpathy .................. G09G 5/14 |
| | | 345/649 |
| 2013/0076595 A1* | 3/2013 | Sirpal .................. G06F 3/1438 |
| | | 345/1.3 |
| 2013/0120447 A1 | 5/2013 | Kim et al. |
| 2013/0125045 A1 | 5/2013 | Sun et al. |
| 2014/0157128 A1* | 6/2014 | Hussain .................. G06F 3/167 |
| | | 715/727 |
| 2014/0215336 A1* | 7/2014 | Gardenfors ............. G06F 3/017 |
| | | 715/719 |

FOREIGN PATENT DOCUMENTS

| | | |
|---|---|---|
| EP | 2 595 043 A2 | 5/2013 |
| EP | 2 595 046 A2 | 5/2013 |
| JP | 2003-71129 A | 3/2003 |
| KR | 10-2006-0081950 A | 7/2006 |
| KR | 10-2010-0022793 A | 3/2010 |
| KR | 10-2010-0082373 A | 7/2010 |
| KR | 10-2012-0073548 A | 7/2012 |
| WO | 2012/166282 A1 | 12/2012 |

\* cited by examiner

ELECTRONIC DEVICE AND METHOD FOR CONTROLLING MULTI-WINDOWS IN THE ELECTRONIC DEVICE

CLAIM OF PRIORITY

This application claims the priority under 35 U.S.C. § 119(a) from Korean Application Serial No. 10-2013-0077190, which was filed in the Korean Intellectual Property Office on Jul. 2, 2013, the entire content of which is hereby incorporated by reference in its entirety.

BACKGROUND

1. Technical Field

The present disclosure relates to an electronic device and a method for controlling multi-windows in the electronic device. More particularly, the present disclosure relates to an electronic device capable of individually controlling multi-windows and a method for controlling the multi-windows in the electronic device.

2. Description of the Related Art

Recently, electronic devices, such as, for example, terminals equipped with large-sized displays have become faster in terms of response and increasing in popularity. The use of terminals of the prior art has been limited due to restrictions in a screen size and a key input means. However, in recent years, these restrictions are being gradually reduced as large-sized screens and touch screens are introduced.

In addition, more recent terminals provide a multi-window function, according to which a screen is divided into a plural of regions (windows) on which two or more applications can be simultaneously executed through a single terminal.

When the multi-window function is employed in the terminal, a user can simultaneously perform two types of independent tasks in a single terminal by regional division of the screen, and significantly increase task efficiency by also performing one type of task.

This multi-window functionality of the terminal is receiving acclaim together with a palm-up player function in the market.

Current multi-window functionality of the terminal focuses on a method by which a single user may perform several tasks at the same time. For example, the current multi-window function allows a user to selectively and conveniently use two functions at the same time when the user wants to see the video while having access to the Internet.

Therefore, the current multi-window function may be very convenient when a single user performs various tasks at the same time. However, when several users share functions of a single terminal by using the multi-window function thereof, there is inconvenience in using the terminal.

SUMMARY

Accordingly, an exemplary aspect of the present invention is to provide an electronic device capable of individually controlling multi-windows and a method for controlling the multi-windows in the electronic device.

In accordance with another exemplary aspect of the present invention, an electronic device is provided. The electronic device includes: a display unit including multi-windows on which executions of a plurality of applications are displayed; and a controller configured for controlling the rotation of frames of the multi-windows in accordance with frame rotation information respectively set for the multi-windows, and to control display of the executions of the plural applications, wherein the controller controls a division of the output of the display screen of the display unit depending on a number of applications being executed, the divided screens representing the multi-windows, and a display of the executions of the plural applications on the multi-windows, respectively, wherein the controller, when a gesture for frame rotation is detected on a predetermined window from among the multi-windows, controls a rotation of a frame of the predetermined window in response to the gesture and a display of an execution of the predetermined application on the predetermined window in accordance with the rotated frame of the predetermined window, and wherein the gesture for frame rotation includes at least one of a rotation gesture using a single touch, a rotation gesture using multi-touches, a rotation gesture using an icon, a rotation gesture for a handle user interface (UI) displayed for frame rotation, a selection of a handle UI displayed for frame rotation, and a predetermined gesture.

In accordance with another exemplary aspect of the present invention, an electronic device is provided. The electronic device includes: an input manager for receiving an event and transmitting the event to an event manager in accordance with the generation of a gesture for frame rotation on a predetermined window among multi-windows; the event manager for analyzing the type of event received from the input manager and transmitting a frame rotation event to a frame manager as the analyzed result; the frame manager for, when receiving the frame rotation event from the event manager, identifying a frame of the window on which the received frame rotation event is generated, identifying the type of application executed and displayed on the frame of the window, and transmitting the frame rotation event to the identified application, thereby allowing the identified application to perform a frame rotation operation of the frame; and an orientation manager for updating and registering frame rotation information of the application performing the frame rotation operation.

In accordance with another exemplary aspect of the present invention, an electronic device is provided. The electronic device includes: a display unit having a display screen configured for displaying an output of multi-windows on which executions of a plurality of applications are displayed; and a controller for, when rotation of the electronic device is detected, if frame rotation information of the multi-windows are different from each other, controlling a rotation of the frames of the multi-windows such that the frame rotation information respectively set for the multi-windows are maintained and a display of the executions of the plurality of applications.

In accordance with another aspect of the present invention, a method for controlling multi-windows of an electronic device is provided. The method includes: in a multi-window mode in which executions of a plurality of applications are displayed, rotating frames of the multi-windows in accordance with frame rotation information respectively set for the multi-windows and displaying the executions of the plurality of applications, and further comprising: controlling by the controller a division of a screen of a display unit into a quantity of multi-windows depending on a number of applications executed for the multi-windows, and a display of the executions of the plurality of applications on the divided screens representing the multi-windows, respectively, wherein the display of the executions of the plural applications includes: when a gesture for frame rotation is detected on a predetermined window among the multi-windows, rotating a frame of the predetermined window in response to the gesture and displaying an execution of the predetermined application in accordance with the rotated frame of the predetermined window, and wherein the gesture for frame rotation includes at least one of a rotation gesture using a single touch, a rotation gesture using multi-touches, a rotation gesture using an icon, a rotation gesture for a handle user interface (UI) displayed for frame rotation, a selection of a handle UI displayed for frame rotation, and a predetermined gesture.

In accordance with another aspect of the present invention, a method for controlling multi-windows of an electronic device is provided. The method includes: receiving, by an input manager, an event and transmitting the event to an event manager in accordance with the generation of a gesture for frame rotation on a predetermined window among multi-windows; analyzing, by an event manager, the type of event received from the input manager and transmitting a frame rotation event to a frame manager as the analyzed result; when receiving the frame rotation event from the event manager, identifying, by a frame manager, a frame of the window on which the received frame rotation event is generated, identifying the type of application executed and displayed on the frame of the window, and transmitting the frame rotation event to the identified application, thereby allowing the identified application to perform a frame rotation operation of the frame; and updating and registering, by an orientation manager, frame rotation information of the application performing the frame rotation operation.

In accordance with another aspect of the present invention, a method for controlling multi-windows of an electronic device is provided. The method includes: in response to rotation of the electronic device being detected, determining whether frame rotation information of the multi-windows are different from each other; and when the frame rotation information of the multi-windows are different from each other, rotating the frames of the multi-windows such that the frame rotation information respectively set for the multi-windows are maintained, regardless of a rotation of the electronic device, and displaying the executions of the plurality applications on the multi-windows, respectively.

BRIEF DESCRIPTION OF THE DRAWINGS

The above and other exemplary aspects, features, and advantages of the present invention will become more apparent to a person or ordinary skill in the art from the following detailed description taken in conjunction with the accompanying drawings, in which.

DETAILED DESCRIPTION

Figure 1:
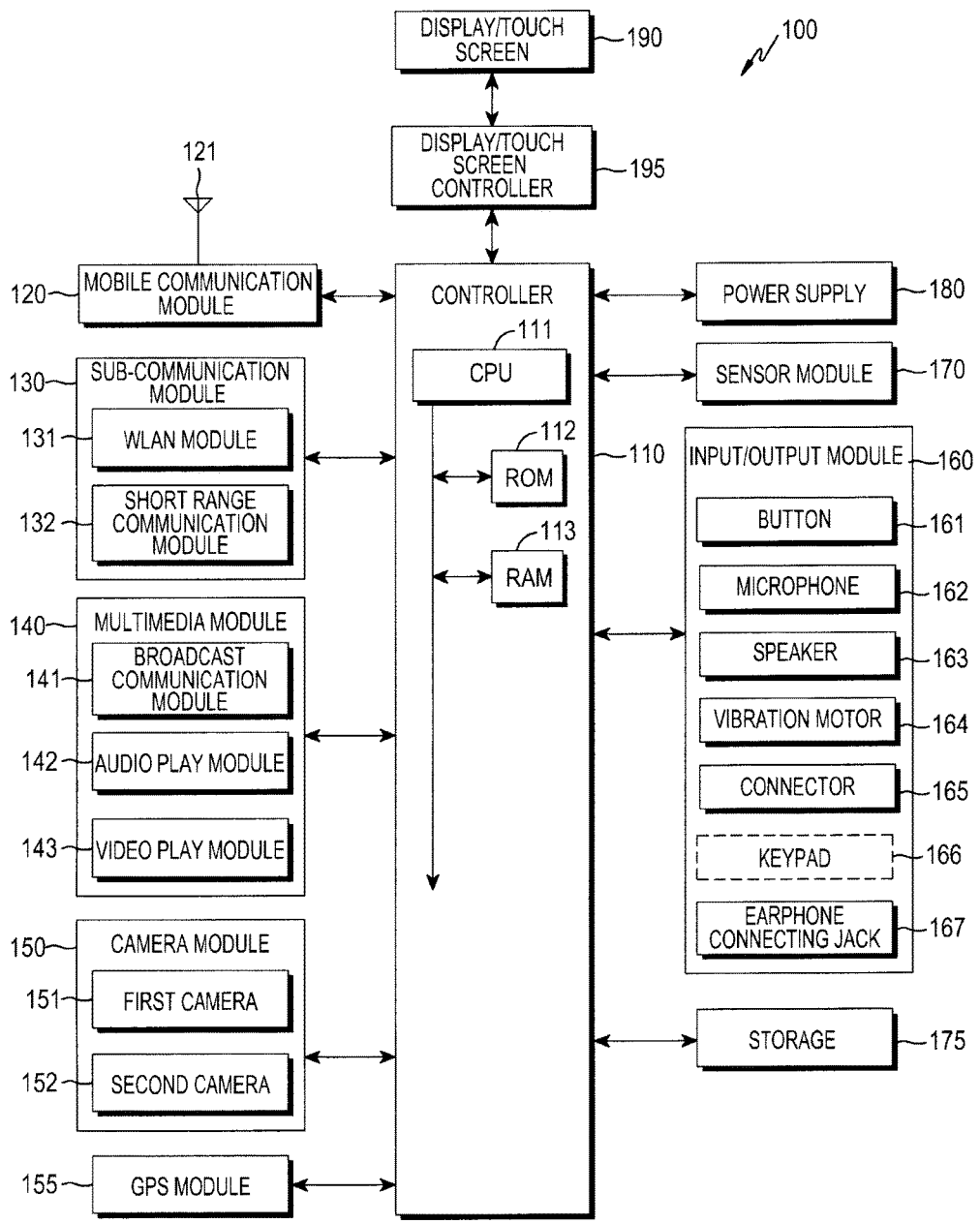
FIG. 1 is a block diagram schematically showing an electronic device according to various exemplary embodiments of the present invention.

Hereinafter, non-limiting exemplary embodiments according to the present invention will be described in detail with reference to the accompanying drawings. However, the presently claimed invention is not restricted by the exemplary embodiments, and is not limited in scope to the exemplary embodiments. The same reference numerals represented in each of the drawings indicate the elements that perform substantially the same functions.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the presently claimed invention. The terms used in this application is for the purpose of describing particular embodiments only and is not intended to be limiting of the invention. As used herein, the singular forms are intended to include the plural forms as well, unless the context clearly indicates otherwise.

FIG. 1 is a block diagram schematically showing an electronic device according to a non-limiting exemplary embodiment of the present invention.

Referring now to FIG. 1, an electronic device 100 may be connected with an external device (not shown) by using external device connectors, such as a sub-communication module 130, a connector 165, and an earphone connecting jack 167. The "external device" may include various devices that are attachable to and detachable from the electronic device 100 and connectable to the electronic device by a wired connection, such as an earphone, an external speaker, a universal serial bus (USB) memory, a charger, a cradle/dock, a digital multimedia broadcasting (DMB) antenna, a mobile payment-related device, a healthcare device (a blood sugar meter or the like), a game machine, and a vehicle navigator. Also, the "external device" may include a Bluetooth device, a Near Field Communication (NFC) device, a WiFi Direct device, and a wireless Access Point (AP), which are wirelessly connectable to the electronic device 100 by local communication. Also, the external device may include another device, a mobile phone, a smart phone, a tablet PC, a desktop PC, and a server.

As shown in FIG. 1, the electronic device 100 includes a display unit/touch screen 190 and a display/touch controller 195. In addition, the electronic device 100 includes a controller 110, a mobile communication module 120, a sub-communication module 130, a multimedia module 140, a camera module 150, a global positioning system (GPS) module 155, an input/output module 160, a sensor module 170, a storage unit 175, and a power supply unit 180. The sub-communication module 130 includes at least one of a wireless local area network (LAN) module and a local communication module 132. The multimedia module 140 includes at least one of a broadcast communication module 41, an audio reproducing module 142, and a video reproducing module 143. The camera module 150 includes at least one of a first camera 151 and a second camera 152. The input/output module 160 includes at least one of a button 161, a microphone 162, a speaker 163, a vibration motor 164, a connector 165, and a keypad 166. Hereinafter, the display unit/touch screen will be referred to as a touch screen 190 and the display/touch controller will be referred to as a touch screen controller 195 as examples thereof, respectively.

The controller 110 includes circuitry such as a processor or microprocessor, and may include a Central Processing Unit (CPU) 111, a non-transitory Read-Only Memory (ROM) 112 for storing a control program comprising machine executable code that is loaded in the processor to configure the controller for controlling the electronic device therein, and a non-transitory Random-Access Memory (RAM) 113 for memorizing signals or data inputted from the outside of the electronic device 100 or being used as a memory region for tasks performed by the electronic device 100. Other types of non-transitory memory may be included. The CPU 111 may include, for example, a single core, a dual core, a triple core, or a quad core, as non-limiting examples provided for illustrative purposes. The CPU 111, the ROM 112, and the RAM 113 may be connected to each other through internal buses as part of a circuit.

The controller 110 may be configured to control the mobile communication module 120, the sub communication module 130, the multimedia module 140, the camera module 150, the GPS module 155, the input/output module 160, the sensor module 170, the storage unit 175, the power supplier 180, the touch screen 190, and the touch screen controller 195. It should be understood and appreciated by a person or ordinary skill in the art that under the broadest reasonable interpretation, the term "module" as used herein does not refer to software per se or other non-statutory constructions, and when recited in the appended claims, can include machine executable code on a non-transitory machine readable memory that is loaded into a processor or sub-processor in the module itself or by another processor such as in the controller 110.

In addition, according to a number of non-limiting exemplary embodiments of the present invention, the controller 110 may be configured to control the rotation of frames of multi-windows in accordance with different frame rotation information respectively set for the multi-windows, and to control the display of the executions of applications on the multi-windows in a multi-window mode.

The multi-window mode according to a number of non-limiting exemplary embodiments of the present invention refers to a mode in which a screen of the touch screen 190 is divided into a plurality of regions, on which executions of different applications may be respectively displayed. In a number of non-limiting exemplary embodiments of the present invention, the plurality of divided regions may be referred to as the multi windows in the multi-window mode. Here, one window is one of the divided regions and, as an individual frame, displays an execution of a corresponding application thereon.

In addition, according to a number of non-limiting embodiments of the present invention, when detecting a gesture for frame rotation on a predetermined window among multi-windows, the controller 110 may be configured to control the rotation of a frame of the predetermined window in response to the gesture and then control the display an execution of a predetermined application in accordance with the rotated frame of the predetermined window.

The gesture for frame rotation may include, for some non-limiting examples provided for illustrative purposes, at least one of a rotation gesture using a single touch, a rotation gesture using multi-touches, a rotation gesture using an icon, a rotation gesture using a handle User Interface (UI) displayed for frame rotation, a selection of a handle UI displayed for frame rotation, and a predetermined gesture.

In addition, the controller 110 may be configured to control rotation of the frame automatically in a predetermined window by detecting access of a user and an access position of the user, which may be detected by, for example through presence detection using sonar, infrared, laser, or low-power camera in the multi-window mode, which are some non-limiting examples provided for illustrative purposes. When detecting access of a new user in addition to the present user in the vicinity of the electronic device 100 through the presence detection in the multi-window mode, the controller 110 may activate a frame rotation function for the predetermined window to which the new user has access, to thereby control rotation of the frame of the predetermined window such that the access direction of the new user is a, for example, forward direction and display an execution of a corresponding application. Further, when detecting deviation of the new user from a predetermined range through the presence detection, the controller 110 may deactivate the frame rotation function of the predetermined window to thereby return the predetermined window to the previous direction, and then display an execution of the corresponding application. Since the presence detection technology is known in the art, descriptions thereof will be omitted.

Further, according to a number of non-limiting exemplary embodiments of the present invention, when detecting rotation of the electronic device 100 in the multi-window mode, if the frame rotation information of the respective multi-windows are different from each other, the controller 110 may control the rotation of the frames of the multi-windows such that the frame rotation information respectively set for the multi-windows are maintained, regardless of rotation of the electronic device 100, and then the controller controls the display of executions of the plurality of applications.

Further, according to a number of non-limiting exemplary embodiments of the present invention, when there is a request for changing an execution location of a predetermined application of which an execution is displayed on a predetermined window among the multi-windows, if frame rotation information of at least some of the multi-windows are different from each other, the controller 110 may control the display of an execution of the predetermined application on another window corresponding to the changed execution location in accordance with frame rotation information of another window.

Further, according to a number of non-limiting exemplary embodiments of the present invention, when there is a request for activating respective virtual input units on the multi-windows, if the frame rotation information of at least some of the multi-windows are different from each other, the controller 110 may control the activation and display of the respective virtual input units on the multi-windows. In addition, when a plurality of input values are generated through the respective virtual input units displayed on the multi-windows, the controller 110 may control the identification of respective frames of the windows in which the plurality of input values are generated and then provide corresponding input values to applications being executed on the identified windows.

Further, according to a number of non-limiting exemplary embodiments of the present invention, when multi-touches are respectively and simultaneously generated on the multi-windows, if the frame rotation information of at least some of the multi-windows are different from each other, the controller 110 controls the identification of input coordinates of the respective multi-touches and frames of the windows on which the multi-touches are respectively generated, and allows corresponding applications being respectively executed on the identified windows to perform operations corresponding to the corresponding input coordinates.

Further, according to a number of non-limiting exemplary embodiments of the present invention, when audio data are simultaneously outputted from a plurality of applications being respectively executed on the multi-windows, if frame rotation information of at least some of the multi-windows are different from each other, the controller 110 controls the output to only the audio data of the application having a first priority among the plurality of applications and to mute the audio data of the other applications.

The mobile communication module 120 connects the electronic device 100 with the external device through mobile communication by using at least one antenna—one or a plurality of antennas 121—under the control of the controller 110. The mobile communication module 120 performs transmission/reception of a wireless signal for such functions as, for example, voice phone communication, video phone communication, a Short Message Service (SMS), or a Multimedia Messaging Service (MMS) with a mobile phone (not shown), smart phone (not shown), a tablet Personal Computer (PC) or another device (not shown), of which a phone number is inputted to the electronic device 100, just to name a few non-limiting possible examples for illustrative purposes.

The sub-communication module 130 may include at least one of the wireless LAN module 131 and the local communication module 132. For example, the sub-communication module 130 may include only the wireless LAN module 131 or only the local communication module 132, or both the wireless LAN module 131 and the local communication module 132. As previously discussed the modules herein are not software per se and comprise statutory subject matter, including a machine readable medium such as a non-transitory memory having machine executable code, that is loaded and executed by either an integrated circuit such as a communication processor, or executed by the controller 110.

The wireless LAN module 131 may be connected to the Internet under the control of the controller 110 in a place where a wireless Access Point (AP) (not shown) is installed. The wireless LAN module 131 supports the wireless LAN standard (IEEE802.11x) of the Institute of Electrical and Electronics Engineers (IEEE). The local communication module 132 may perform wireless local communication between the electronic device 100 and an image forming device (not shown) under the control of the controller 110. The local communication may include, for example, Bluetooth, Infrared Data Association (IrDA), WiFi Direct communication, Near Field Communication (NEC), as some non-limiting examples.

The electronic device 100 may include at least one of the mobile communication module 120, the wireless LAN module 131, and the local communication module 132 according to the performance thereof. For example, the electronic device 100 may include, for example, a combination of the mobile communication module 120, the wireless LAN module 131, and the local communication module 132.

The multimedia module 140 may include, for example, the broadcast communication module 141, the audio reproducing module 142, or the video reproducing module 143. The broadcast communication module 141 may receive a broadcast signal (for example, a television (TV) broadcast signal, a radio broadcast signal, or a data broadcast signal) and broadcast additional information (for example, electric program guide (EPS) or electric service guide (ESG)) broadcasted from a broadcasting station through a broadcast communication antenna (not shown), under the control of the controller 110. The audio reproducing module 142 may reproduce a digital audio file (for example, a file having a file extension of mp3, wma, ogg, or way) stored or received, under the control of the controller 110. The video reproducing module 143 may reproduce a digital video file (for example, a file having a file extension of mpeg, mpg, mp4, avi, mov, or mkv) stored or received, under the control of the controller 110. The video reproducing module 143 may reproduce the digital audio file.

With continued reference to FIG. 1, the multimedia module 140 may include the audio reproducing module 142 and the video reproducing module 143 other than the broadcast communication module 141. In addition, the audio reproducing module 142 or the video reproducing module 143 of the multimedia module 140 may be included in the controller 110. In other words, the layout of the structure of the electronic device is not limited the groupings as shown in FIG. 1.

The camera module 150 may include, for example, at least one of the first camera 151 and the second camera 152 for photographing a still image or a video image under the control of the controller 110. Further, the first camera 151 or the second camera 152 may include an auxiliary light source for providing a light having an amount of light necessary for photographing thereto (for example, flash (not shown)). The first camera 151 may be disposed on a front surface of the electronic device 100, and the second camera 152 may be disposed on a back surface of the electronic device 100. In a different way, the first camera 151 and the second camera 152 are disposed adjacently to each other (for example, the interval between the first camera 151 and the second camera 152 is greater than 1 cm but smaller than 8 cm) to photograph a three-dimensional still image or a three-dimensional video image.

The GPS module 155 may receive radio waves from a plurality of GPS satellites (not shown) on Earth orbit and calculate a position of the electronic device 100 by using the Time Of Arrival (TOA) from the GPS satellite (not shown) to the electronic device 100.

The input/output module 160 may include, for example, at least one of the plurality of buttons 161, the microphone 162, the speaker 163, the vibration motor 164, the connector 165, and the keypad 166.

The buttons 161 may be formed on a front surface, a side surface, or a back surface of a housing of the electronic device 100, and may include at least one of a power/lock button (not shown), a volume button (not shown), a menu button, a home button, a back button, and a search button 161. The buttons may be virtual buttons and the input/output module may be a touch screen.

The microphone 162 receives voice or sound to generate an electrical signal under the control of the controller 110.

The speaker 163 may output sounds corresponding to a number of non-limiting signals of the mobile communication module 120, the sub-communication module 130, the multimedia module 140, or the camera module 150 (for example, a wireless signal, a broadcast signal, a digital audio file, a digital video file, photographing, and the like) to the outside of the electronic device 100, under the control of the controller 110. The speaker 163 may output sounds corresponding to functions performed by the electronic device 100 (for example, a button control sound or a ring back tone corresponding to phone communication). There may be one or a plurality of speakers 163 formed at one or a plurality of appropriate locations of the housing of the electronic device 100.

The vibration motor 164 may convert an electrical signal into a mechanical vibration under the control of the controller 110. For example, when the electronic device 100 in a vibration mode receives voice phone communication from another device (not shown), the vibration motor 164 is operated. There may, for example, be one or a plurality of vibration motors 164 formed within the housing of the electronic device 100. The vibration motor 164 may be operated in response to a touch action of the user on the touch screen 190 and successive motions of touch on the touch screen 190.

The connector 165 may be used as an interface for connecting the electronic device 100 with the external device (not shown) or a power source (not shown). The electronic device 100 may transmit data stored in the storage unit 175 thereof to the external device (not shown) or receive data from the external device (not shown) through a wired cable connected to the connector 165, under the control of the controller 110, in addition, the electronic device 100 may receive power from the power source (not shown) or charge a battery (not shown) by using the power source through the wired cable connected to the connector 165.

The keypad 166 may receive a key input from the user to control the electronic device 100. The keypad 166 may include, for example a physical keypad (not shown) formed in the electronic device 100 or a virtual keypad (not shown) displayed on the touch screen 190. The physical keypad (not shown) formed in the electronic device 100 may be omitted according to the performance or structure of the electronic device 100.

An earphone (not shown) may be inserted into the earphone connecting jack 167 and thus connected to the electronic device 100 to receive sound signals.

The sensor module 170 includes at least one sensor for detecting a state of the electronic device 100. For example, the sensor module 170 may include, for example, a proximity sensor for detecting whether or not the user has access to the electronic device 100, an illumination sensor (not shown) for detecting the amount of light around the electronic device 100, a motion sensor (not shown) for detecting the operation of the electronic device 100 (for example, rotation of the electronic device 100 or acceleration or vibration applied to the electronic device 100), a geomagnetic sensor (not shown) for detecting the point of the compass of the electronic device 100 by using geomagnetism, a gravity sensor for detecting the acting direction of gravity, or an altimeter for detecting the altitude by measuring atmospheric pressure. At least one sensor may detect the state of the electronic device 100, generate a signal corresponding to the detected status, and transmit the signal to the controller 110. The sensors of the sensor module 170 may be added thereto or deleted therefrom according to the performance of the electronic device 100.

The storage unit 175, which comprises a non-transitory machine readable memory, may store signals or data inputted/outputted in accordance with operations of the mobile communication module 120, the sub-communication module 130, the multimedia module 140, the camera module 150, the GPS module 155, the input/output module 160, the sensor module 170, and the touch screen 190 under the control of the controller 110. The storage unit 175 may store machine executable control programs and applications for controlling the electronic device 100 or the controller 110.

The term "storage unit" includes a memory card (not shown) (for example, a Secure Digital (SD) card or a memory stick) mounted on the storage unit 175, the ROM 112 or the RAM 113 within the controller 110, or the electronic device 100. The storage unit may include a nonvolatile memory, a volatile memory, a Hard Disk Drive (HDD), or a Solid State Drive (SSD), just to name a few non-limiting possibilities.

In addition, according to a number of non-limiting exemplary embodiments of the present invention, the storage unit 175 may store frame rotation information of each window in the multi-window mode.

In addition, the storage unit 175 may store the OS framework for frame rotation control and input control of each window in the multi-window mode according to a number of non-limiting exemplary embodiments of the present invention, and the OS framework will be described in detail with reference to FIG. 2 below.

The power supplier 180 may supply power to one or a plurality of batteries (not shown) disposed in the housing of the electronic device 100 under the control of the controller 110. The one or plural batteries (not shown) may supply the power to the electronic device 100. In addition, the power supplier 180 may supply the power inputted from an external power source (not shown) through the wired cable connected to the connector 165, to the electronic device 100. In addition, the power supplier 180 may supply the power wirelessly inputted from the external power source through wireless charging technology to the electronic device 100.

The touch screen 190 may provide a user interface corresponding to various services (for example, phone communication, data transmission, broadcasting, and photographing pictures) to the user. The touch screen 190 may transmit an analog signal corresponding to at least one touch inputted to the user interface to the touch screen controller 195. The touch screen 190 may receive at least one touch through a body part of the user (for example, a finger including a thumb) or a touchable input unit (for example, a stylus pen). Also, the touch screen 190 may receive successive motions of one touch among one or more touches. The touch screen 190 may transmit an analog signal corresponding to the successive motions of the touch to the touch screen controller 195.

The touch in the present invention is not limited to a touch between the touch screen 190 and the body part of the user or the touchable input, but may include non-contact touch, (a non-touch, for example, when the detectable interval between the touch screen 190 and the body part of the user or the touchable input is, for example 1 mm or smaller and thus is considered a touch without making physical contact with the surface of the touch screen). The detectable interval for of the touch screen 190 may be changed depending on the performance or structure of the electronic device 100, and thus actual physical contact with the touch screen is not an absolute requirement in view of the aforementioned explanation of non-contact touch.

The touch screen 190 may be embodied in, for example, a resistive type, a capacitive type, an infrared type, or an acoustic wave type.

In addition, according to a number of non-limiting exemplary embodiments of the present, in the multi-window mode, the screen is divided into the multi-windows for displaying executions of the plurality of applications thereon, and the plurality of applications may be respectively executed and displayed in the same or in different directions on the multi-windows of which the frames are rotated in accordance with the respective frame rotation information.

The touch screen controller 195 (FIG. 1) converts the analog signal received from the touch screen 190 into a digital signal (for example, X and Y coordinates) and transmits the digital signal to the controller 110. The controller 110 may control the touch screen 190 by using the digital signal received from the touch screen controller 195. For example, the controller 110 may select a shortcut icon (not shown) displayed on the touch screen 190 or execute the shortcut icon (not shown) in response to a touch, in addition, the touch screen controller 195 may be included in the controller 110.

Figure 2:
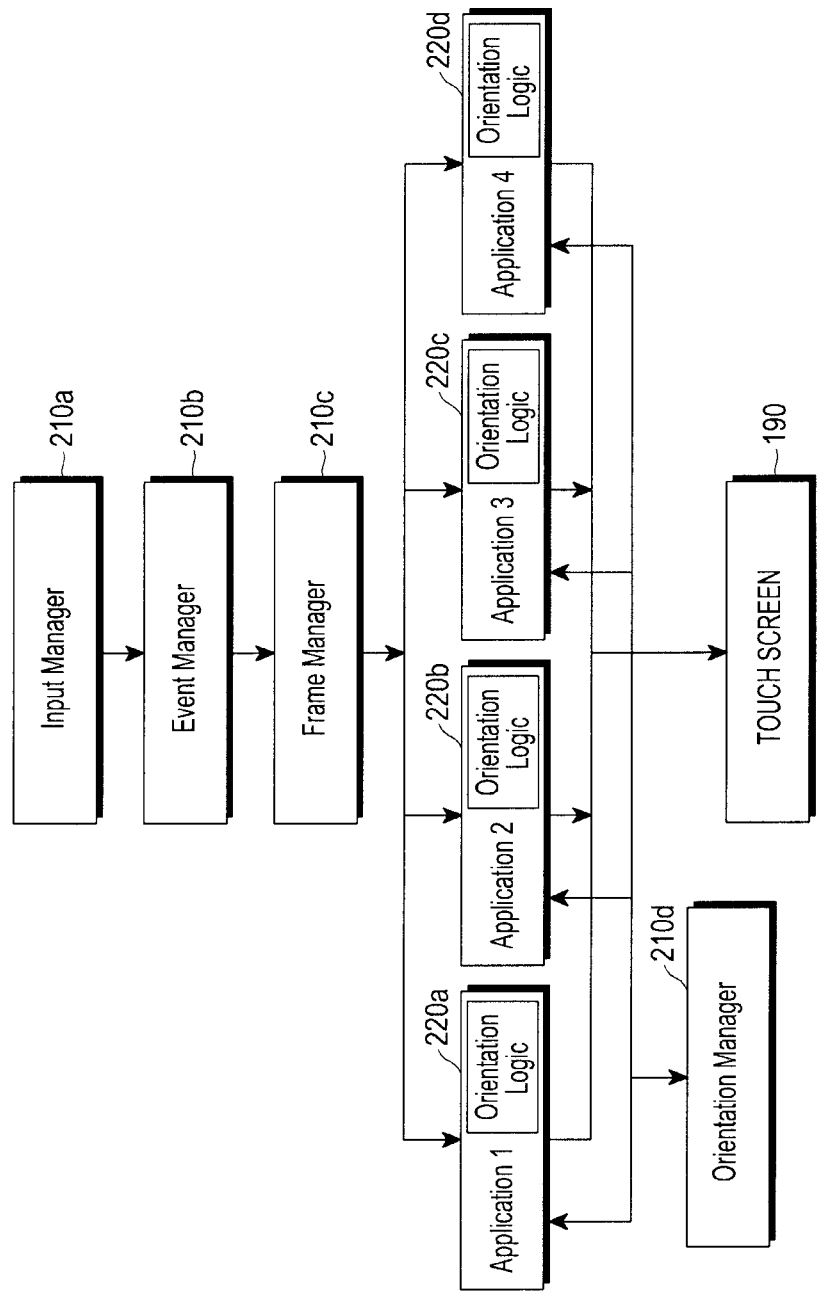
FIG. 2 is a block diagram schematically showing an operation system (OS) framework of an electronic device according to various exemplary embodiments of the present invention.

FIG. 2 is a block diagram schematically showing an OS framework of an electronic device (100) according to a number of non-limiting exemplary embodiments of the present invention. The OS framework is executed in hardware such as a processor, microprocessor, CPU, controller, etc. which may include one or more circuits including integrated circuitry.

Referring now to FIG. 2, an OS framework stored in the non-transitory storage unit 175 of the electronic device 100 may be in communication with an input manager 210a, an event manager 210b, a frame manager 210c, and an orientation manager 210d, with the respective managers optionally arranged in the touch screen controller 195. In turn, each of the managers 210a-210d are also communicatively linked to each other typically through a bus or busses. All of these managers 210a-210d do not constitute software per se, and are loaded into hardware for execution, such as a microprocessor, sub-processor or controller in an integrated circuit of the touch screen controller 195, or the controller 110.

The input manager 210a may receive an event generated in the electronic device 100 and transmit the received event to the event manager 210b. The generated event may include all the events process-able by the electronic device 100, such as a touch, a request, and a motion, which are generated in the electronic device 100.

In addition, the input manager 210a may display respective virtual inputs on frames of the multi-windows in the multi-window mode at the request of the frame manager 210c.

With continued reference to FIG. 2, the event manager 210b analyzes the type of event transmitted from the input manager 210a and transmits the analyzed event to the frame manager 210c.

The frame manager 210c identifies a frame of a window in which the event received from the event manager 210b is to be performed, and transmits the event to an application executed on the identified window, so that the application can perform an operation corresponding to the transmitted event.

The frame manager 210c according to a number of non-limiting exemplary embodiments of the present invention may control individually the multi-windows by transmitting, to corresponding applications, events respectively generated from plural applications 220a to 220d executed and displayed on the multi-windows. The plural applications 220a to 220d are stored in the storage unit 175 and are executed by hardware, for example, circuitry such as an integrated circuit of the controller 110 or touch screen controller 195, the integrated circuit being a processor, microprocessor, etc. The plural applications 220a to 220d each include an internal logic (orientation logic) for performing a frame rotating control operation when a frame rotation event is transmitted from the frame manager 210c.

When the type of event received from the event manager 210b is the frame rotation event, the frame manager 210c in this example identifies a frame of a widow detecting the frame rotation event, identifies a corresponding application of which an execution was displayed on the identified window, and transmits the frame rotation event to the identified application.

Alternatively, when the type of event received from the event manager 210b is an electronic device rotational event, if frame rotation information respectively set for the multi-windows that are different from each other, the frame manager 210c may transmit the frame rotation information for allowing maintenance of the frame rotation information respectively set for the multi-windows to the plural applications, respectively, regardless of rotation of the electronic device.

Alternatively, when the type of event received from the event manager 210b is a requested change event of an application execution location, if the frame rotation information respectively set for the multi-windows are different from each other, the frame manager 210c identifies a frame of a window detecting the request event of change of application execution location. The frame manager 210c identifies a predetermined application of which an execution is displayed on the identified window, and transmits a frame location value of another window corresponding to the execution location to be changed and the frame rotation information of another window to the identified predetermined application, so that an execution of the predetermined application can be displayed on another window in a direction corresponding to the frame rotation information of said another window.

Alternatively, when the type of event received from the event manager 210b is, for example, a request event of activation of a virtual input unit, the frame manager 210c may request the input manager 210a to display activation of the respective virtual input units on the multi-windows.

Alternatively, when the type of event received from the event manager 210b is, for example, a generation event of input value that plural input values are generated from the virtual input units respectively displayed on the multi-windows, the frame manager 210c identifies respective frames of windows in which the plural input values are generated. In addition, the frame manager 210c may identify applications of which executions are displayed on the identified windows, and provide corresponding input values to the identified applications.

Alternatively, when the type of event received from the event manager 210b is, for example, a multi-touch event that multi-touches are respectively and simultaneously generated on the multi-windows, the frame manager 210c identifies respective input coordinates at which the multi-touches are generated and respective frames of windows on which the multi-touches are generated. In addition, the frame manager 210c may identify applications of which executions are displayed on the identified windows, and transmit corresponding input coordinates to the identified applications.

The orientation manager 210d may register frame rotation information of the multi-windows on which executions of the plurality of applications 220a to 220d are displayed and rotation information of the electronic device 100.

Hereinafter, operations of controlling multi-windows in the electronic device will be described in detail with reference to FIGS. 3A through 20.

FIGS. 3A through 3F are views for describing operations of controlling screen rotation of multi-windows in an electronic device according to a number of non-limiting exemplary embodiments of the present invention. In these non-limiting exemplary embodiments of the present invention, a touch screen that is divided into two windows on which executions of two applications are displayed in a multi-window mode is exemplified, but the number of windows divided in the multi-window mode is not limited to what is shown and discussed.

Figure 3A:
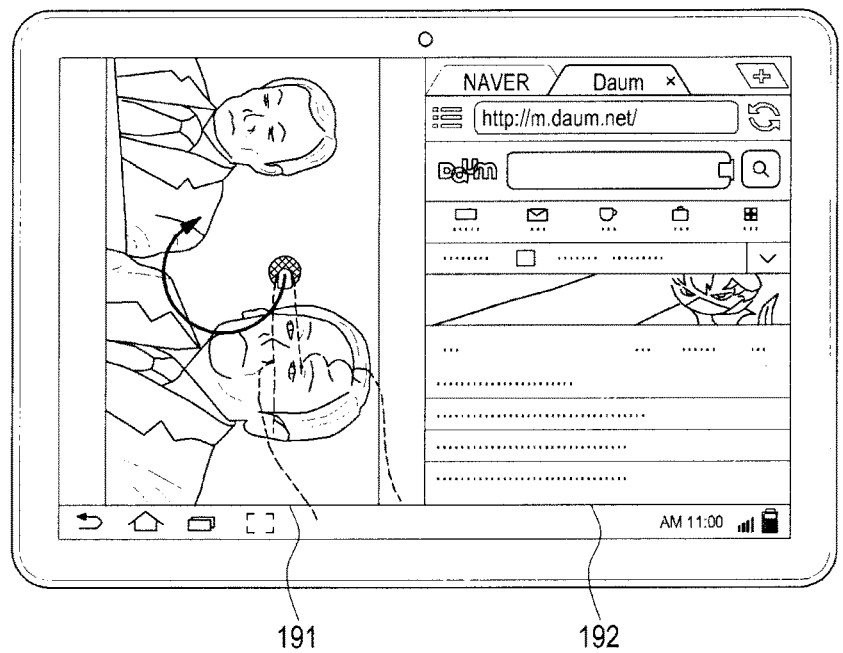
FIG. 3A, FIG. 3B, FIG. 3C, FIG. 3D, FIG. 3E and FIG. 3F are views for describing an operation of controlling screen rotation of multi-windows in an electronic device according to various exemplary embodiments of the present invention.

With reference to FIG. 3A, in a multi-window mode in which a touch screen 190 is divided into a first window 191 and a second window 192, the first window 191 initially displaying an execution of a video application in a direction of 0° and the second window 192 is displaying an execution of an Internet application in a direction of 0°, when a rotation gesture using a single touch is detected on the first window 191, a frame of the first window 191 may be rotated in a direction corresponding to the rotation gesture using a single touch and the execution of the video application may be displayed in accordance with the rotated frame of the first window 191, as shown in FIG. 3A. FIG. 3A shows that the frame of the first window 191 is rotated at an angle of 90° through the rotation of 90° using a single touch, which is generated on the first window 191 and the execution of the video application is displayed on the first window 191 in a direction rotated at an angle of 90° in accordance with the frame rotated at an angle of 90°.

Figure 3B:
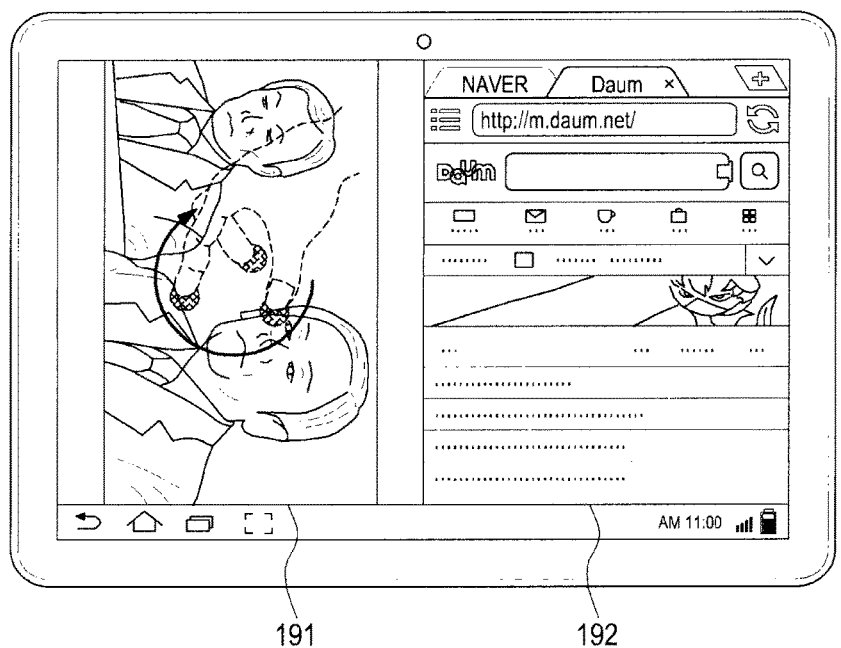

In a multi-window mode in which the touch screen 190 is divided into a first window 191 and a second window 192, the first window 191 initially displaying an execution of a video application in a direction of 0° and the second window 192 displaying an execution of an Internet application in a direction of 0°, when a rotation gesture using multi-touches is detected on the first window 191, a frame of the first window 191 may be rotated in a direction corresponding to the rotation gesture using multi-touches and the execution of the video application may be displayed in accordance with the rotated frame of the first window 191, as shown in FIG. 3B. FIG. 3B shows that the frame of the first window 191 is rotated at an angle of 90° through the rotation of 90° using multi-touches, which is generated on the first window 191 and the execution of the video application is displayed on the first window in a direction rotated at an angle of 90° in accordance with the frame rotated at an angle of 90°.

Figure 3C:
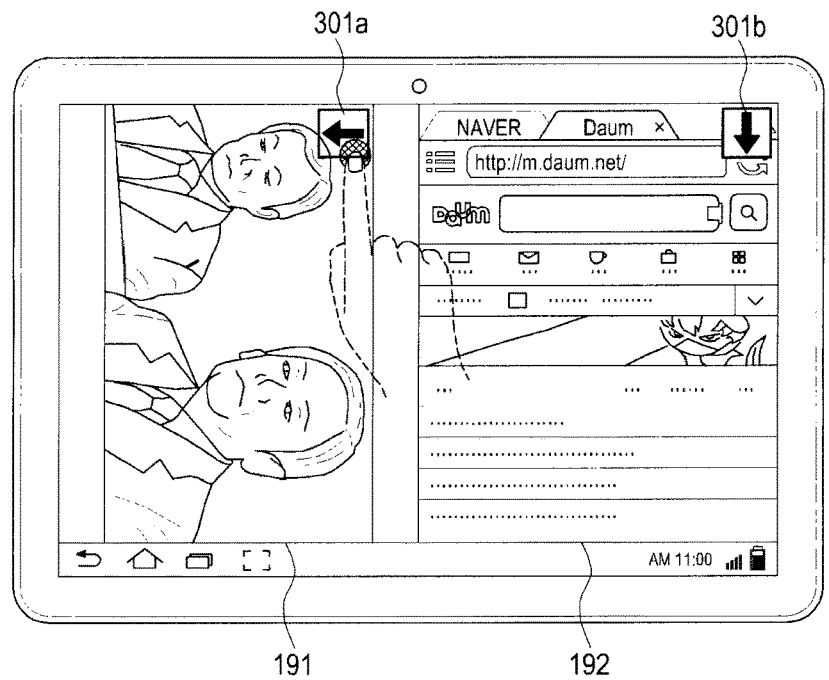

With reference to FIG. 3C, in a multi-window mode in which the touch screen 190 is divided into a first window 191 and a second window 192, the first window 191 in this example initially displaying an execution of a video application in a direction of 0° and the second window 192 displaying an execution of an internet application in a direction of 0°, icons 301a and 301b for frame rotation may be respectively displayed on the first window 191 and the second window 192. The icons 301a and 301b may be displayed at all times or at the request of a user.

In the multi-window mode in which the icons 301a and 301b are respectively displayed on the first window 191 and the second window 192, when the icon 301a is selected on the first window 191 while the video application of which the execution is displayed on the first window 191 is displayed in a direction of 0°, the frame of the first window 191 may be rotated and the execution of the video application may be displayed in accordance with the rotated frame of the first window 191, as shown in FIG. 3C. For example, FIG. 3C shows that the frame of the first window 191 is rotated at an angle of 90° through the selection of the icon 301a, which is generated on the first window 191, and the execution of the video application is displayed on the first window 191 in a direction rotated at an angle of 90° in accordance with the frame rotated at an angle of 90°.

Whenever the icons 301a and 301b are selected, frames of corresponding windows may be rotated at an angle of 90°. Therefore, in FIG. 3C, when the icon 301a is again selected on the first window 191, the frame of the first window 191 is again rotated at an angle of 90° (90 degrees plus 90 degrees, totaling 180 degrees), and the execution of the video application is displayed in a direction rotated at an angle of 180° in accordance with the frame rotated at an angle of 180° (not shown).

In addition, FIG. 3C also shows arrow icons as examples of icons 301a and 301b for frame rotation. In the case of an icon capable of indicating the orientation, such as the arrow icon, the position thereof is changed whenever the frame of the window is rotated, so that a user can see the rotation direction of the application of which the execution is displayed on the window.

Figure 3D:
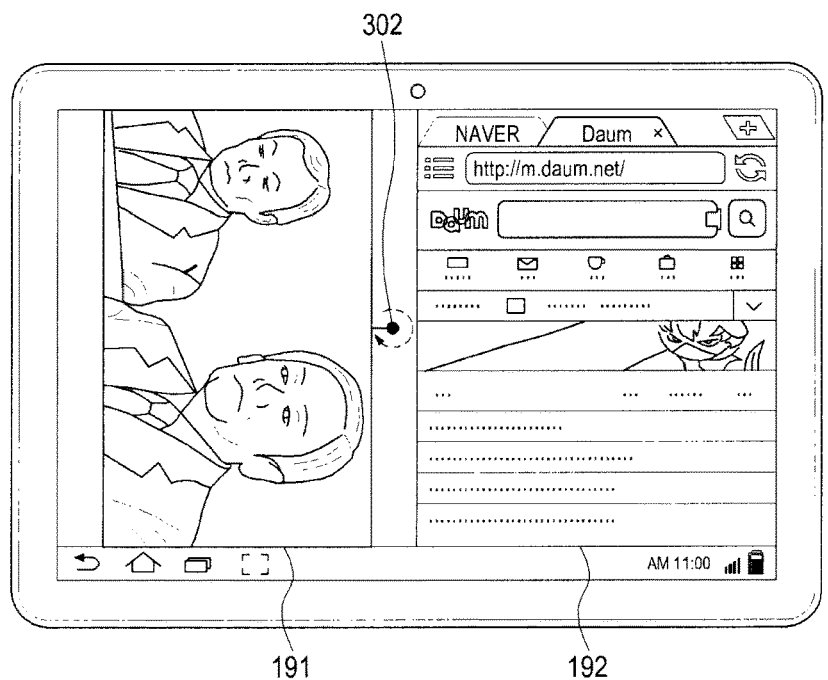

In a multi-window mode in which the touch screen 190 is divided into a first window 191 and a second window 192, the first window 191 initially displaying an execution of a video application in a direction of 0° and the second window 192 displaying an execution of an internet application in a direction of 0°, when a gesture is detected for displaying a handle user interface (UI) 302 for frame rotation, for example, a long touch, is generated on the first window 191, the handle UI 302 for frame rotation may be displayed on a predetermined region of the first window 191. When a rotation gesture using the handle UI 302 is generated, the frame of the first window 191 may be rotated in a direction corresponding to the rotation gesture using the handle UI 302 and the execution of the video application may be displayed in accordance with the rotated frame of the first window 191, as shown in FIG. 3D. FIG. 3D shows that the frame of the first window 191 is rotated at an angle of 90° through the rotation of 90° using the handle UI 302, which is generated on the first window 191 and the execution of the video application is displayed on the first window 191 in a direction rotated at an angle of 90° in accordance with the frame rotated at an angle of 90°.

In addition, in a multi-window mode in which the touch screen 190 is divided into a first window 191 and a second window 192, the first window 191 initially displaying an execution of a video application in a direction of 0° and the second window 192 displaying an execution of an internet application in a direction of 0°, when a gesture for displaying a handle user interface (UI) for frame rotation, for example, a long touch, is generated on the first window 191 or the second window 192, the handle UIs 303a and 303b for frame rotation may be respectively displayed on a predetermined region of the first window 191 and a predetermined region of the second window 192 for a predetermined time.

Figure 3E:
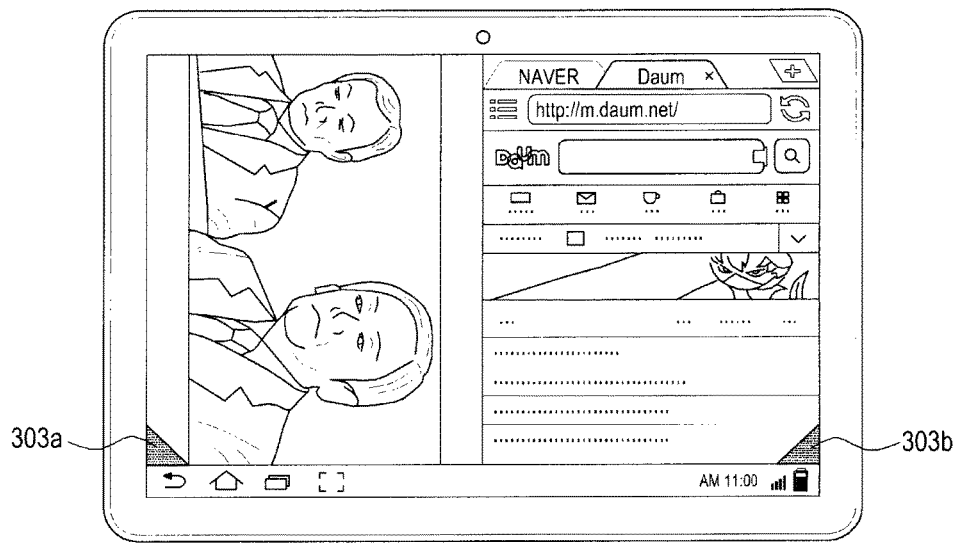

When the handle UI 303a displayed on the predetermined region of the first window is selected, the frame of the first window 191 may be rotated and the execution of the video application may be displayed in accordance with the rotated frame of the first window 191, as shown in FIG. 3E. FIG. 3E shows that the frame of the first window 191 is rotated at an angle of 90° through the selection of the handle UI 303a on the first window 191 and the execution of the video application is displayed on the first window 191 in a direction rotated at an angle of 90° in accordance with the frame rotated at an angle of 90°.

According to an exemplary aspect of the present disclosure, whenever the handle UIs 303a and 303b are selected, frames of corresponding windows may be rotated at an angle of 90°. Therefore, in FIG. 3E, when the handle UI 303a is again selected on the first window 191, the frame of the first window 191 is again rotated at an angle of 90° and the execution of the video application is displayed on the first window in a direction rotated at an angle of 180° (not shown) in accordance with the frame rotated at an angle of 180°.

In addition, FIG. 3E shows that each of the handle UIs 303a and 303b for frame rotation, when each rotation direction is designated by a forward direction, is always displayed at the bottom of the right side, so that a user can see the rotation direction of the application executed and displayed on the window.

Figure 3F:
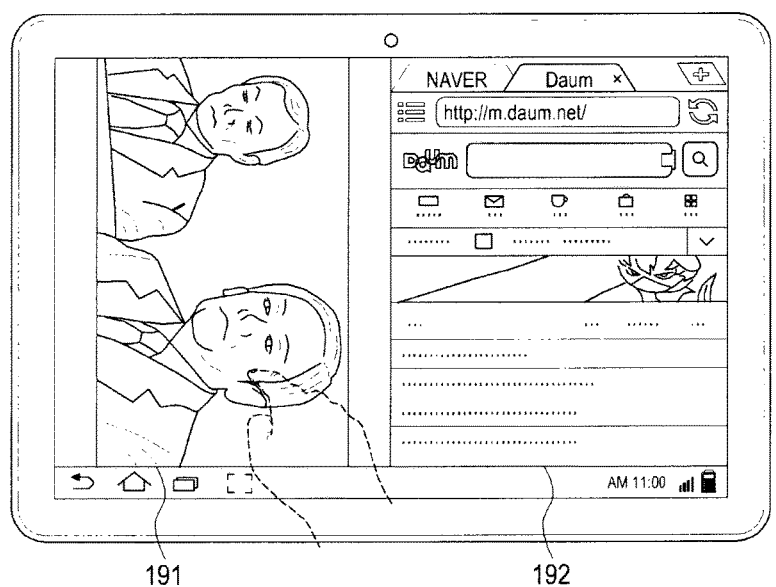

In a multi-window mode in which the touch screen 190 is divided into a first window 191 and a second window 192, the first window 191 initially displaying an execution of a video application in a direction of 0° and the second window 192 displaying an execution of an internet application in a direction of 0°, when a predetermined gesture for frame rotation is generated, for example, two continuous touches are generated on the first window 191 for a predetermined time, a frame of the first window 191 may be rotated and the execution of the video application may be displayed in accordance with the rotated frame of the first window 191, as shown in FIG. 3F.

FIG. 3F shows that the frame of the first window 191 is rotated at an angle of 90° through the predetermined gesture generated on the first window 191 and the execution of the video application is displayed on the first window 191 in a direction rotated at an angle of 90° in accordance with the frame rotated at an angle of 90°. In addition, whenever the predetermined gesture is generated, the frame of the first window 191 may be rotated in a direction of 90°.

As shown in FIGS. 3A through 3F, the executions of the video application and the Internet application are displayed on the first window 191 and the second window 192 in different directions, so that a plurality of users can conveniently execute corresponding applications at their desired positions.

Hereinafter, the operations shown in FIGS. 3A through 3F will now be described in more detail with reference to FIGS. 4 through 5.

Figure 4:
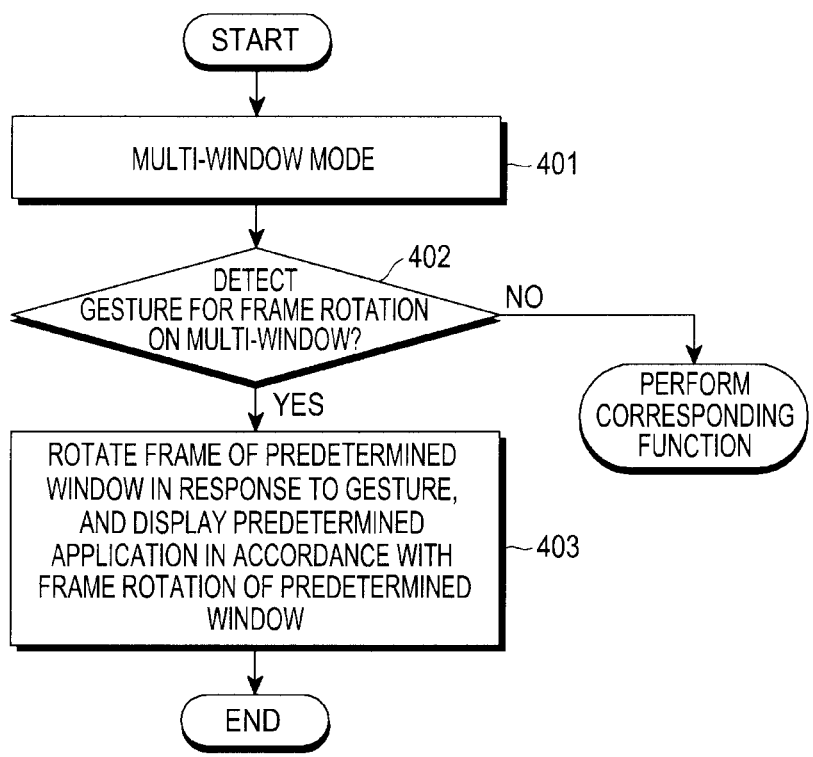
FIG. 4 is a flowchart illustrating an operation of controlling screen rotation of multi-windows in an electronic device according to various exemplary embodiments of the present invention.

FIG. 4 is a flowchart illustrating an operation of controlling screen rotation of multi-windows in an electronic device according to a number of non-limiting exemplary embodiments of the present invention.

Hereinafter, a number of non-limiting exemplary embodiments of the present invention will be described with additional reference to FIG. 1.

Referring now to FIG. 4, in (operation 401), a multi-window mode in which executions of plural applications are respectively displayed on multi-windows obtained by dividing a touch screen 190 into plural screens.

At (operation 402), the controller 110 determines whether a gesture for frame rotation is generated on the multi-windows.

At (operation 403), if the gesture for frame rotation is detected on a predetermined window among the multi-windows in operation 402, the controller 110 controls the rotation of a frame of the predetermined window in response to the gesture for frame rotation and controls display of a predetermined application on the predetermined window in accordance with the frame rotation of the predetermined window.

More particularly, the gesture for frame rotation may include at least one of a rotation gesture using a single touch, or a rotation gesture using multi-touches, or a rotation gesture using an icon, or a rotation gesture of a handle user interface (UI) displayed for frame rotation, that may include a selection of a handle UI displayed for frame rotation, and a predetermined gesture.

FIGS. 3A, 3B, 3C, 3D, 3E, 3F, and 4 illustrate a change of frame rotation information of the window through the generation of the gestures for frame rotation, but the frame rotation information of the window may be also changed by a presence detection other than or in addition to the gestures for frame rotation. For example, when access of a new user other than the current user is also present within a predetermined range of the electronic device 100 (the new user being detected through, for example, the presence detection using sonar, infrared, laser, or low-power camera in a multi-window mode etc.), the controller 110 may activate a frame rotation function for a predetermined window to which the new user has access and thus rotate a frame of the predetermined window such that the access direction of the new user is a forward direction, and display an execution of a corresponding application. Further, when the deviation of the new user from the predetermined range is detected through the presence detection, the controller 110 may deactivate the frame rotation function for the predetermined window and thus return the predetermined window to the previous orientation, and display the execution of the corresponding application.

Figure 5:
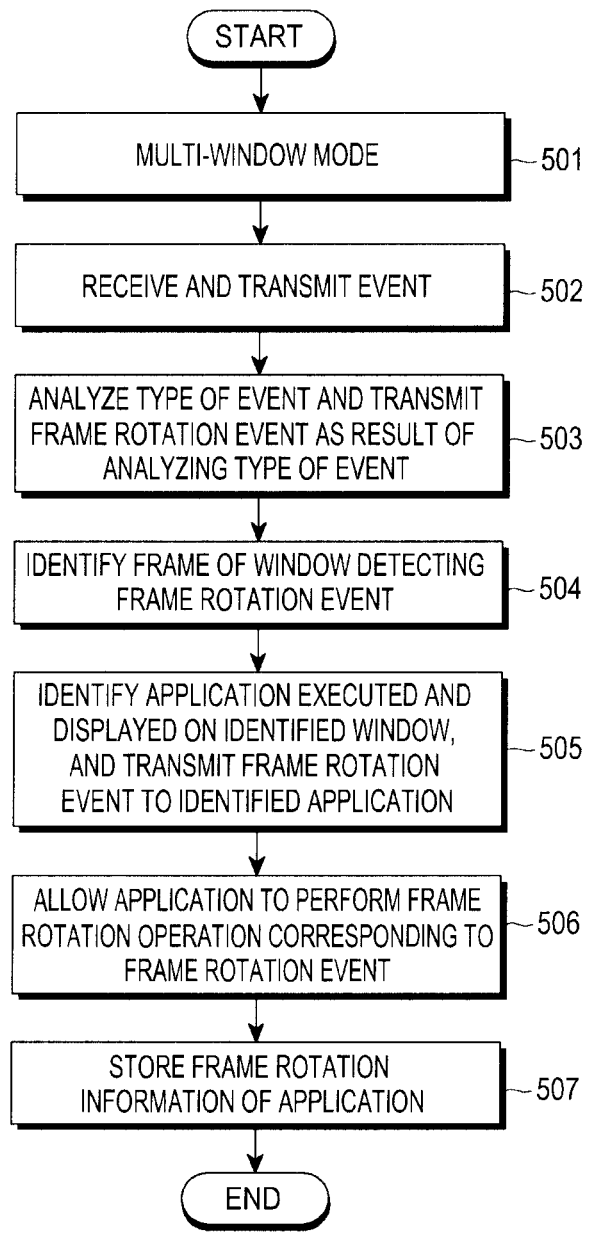
FIG. 5 is a flowchart illustrating an operation of controlling screen rotation of multi-windows in an OS framework of an electronic device according to various exemplary embodiments of the present invention.

FIG. 5 is a flowchart illustrating an operation of controlling screen rotation of multi-windows in an OS framework of an electronic device according to a number of non-limiting exemplary embodiments of the present invention.

Hereinafter, a number of non-limiting exemplary embodiments of the present invention will be described also with reference to FIG. 2.

Referring now to FIG. 5, at (operation 501) in a multi-window mode, when a gesture for frame rotation is generated on a predetermined window among multi-windows, at (operation 502), the input manager 210a may receive an event and transmit the event to the event manager 210b.

At (operation 503), the event manager 210b may analyze the type of event received from the input manager 210a and transmit a frame rotation event to the frame manager 210c as the analyzed result.

At (operation 504), the frame manager 210c may identify a frame of the window on which the received frame rotation event is generated.

At (operation 505), the frame manager 210c may identify the type of application executed and displayed on the frame of the window and transmit the frame rotation event to the identified application.

At (operation 506), the application receiving the frame rotation event from the frame manager 210c may allow performance of a frame rotation operation corresponding to the frame rotation event by using an orientation logic therein.

At (operation 507), when the frame rotation operation is performed in operation 506, the orientation manager 210d may update and register frame rotation information of the application in a storage device.

FIGS. 6A, 6B, 6C and 6D are views for illustrating operations of controlling screen rotation of multi-windows depending on electronic device rotation in an electronic device according to a number of non-limiting exemplary embodiments of the present invention.

In a number of non-limiting exemplary embodiments of the present invention, a touch screen that is divided into, for example, two windows on which executions of two applications are displayed in a multi-window mode is exemplified, but the number of windows divided in the multi-window mode is not limited. Nor does their have to be an exact 1:1 ratio of windows to applications, as one particular window can display more than one application.

Figure 6A:
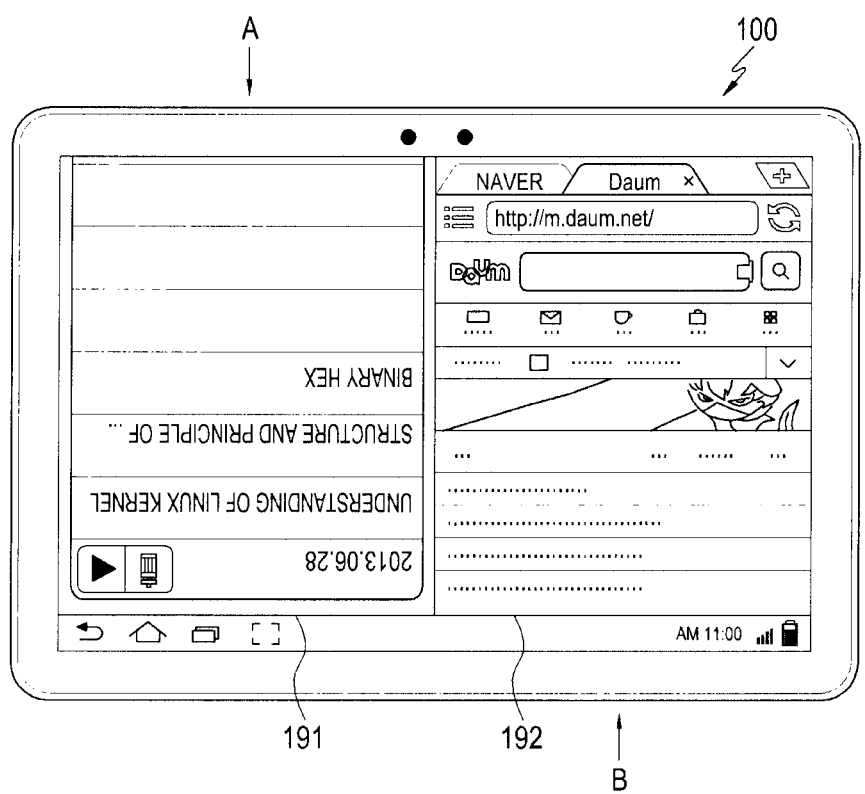
FIG. 6A, FIG. 6B, FIG. 6C, and FIG. 6D are views for describing an operation of controlling screen rotation of multi-windows depending on electronic device rotation in an electronic device according to various exemplary embodiments of the present invention.

FIG. 6A shows a multi-window mode in which a touch screen 190 of device 100 is divided into a first window 191 and a second window 192. As shown in FIG. 6A, the first window 191 displays an execution of a memo application in a direction of A after/while being rotated at an angle of 180° and the second window 192 displays an execution of an Internet application in a direction of B at an angle of 0°.

Figure 6B:
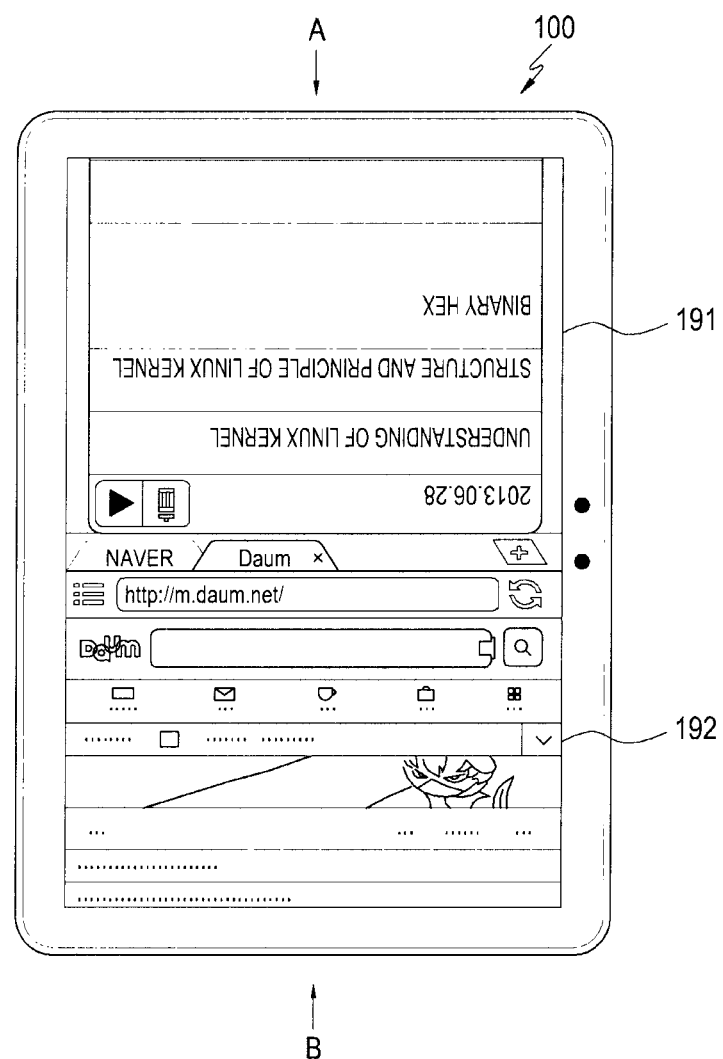

When the electronic device 100 is rotated at an angle of 90° in the multi-window mode as shown in FIG. 6A, then as shown in FIG. 6B a frame of the first window 191 may be rotated at an angle of −90° to be maintained in a direction of A and a frame of the second window 192 may be rotated at an angle of −90° to be maintained in a direction of B, regardless of the 90° rotation of the electronic device 100, as shown in FIG. 6B.

Figure 6C:
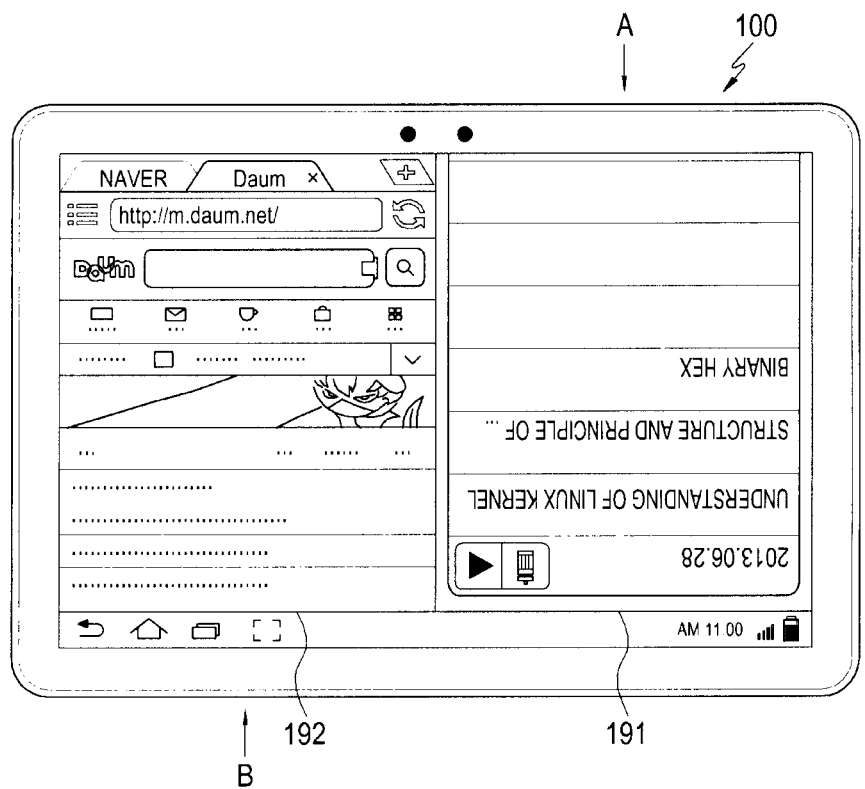

In addition, as shown in FIG. 6C when the electronic device 100 shown in FIG. 6B is again rotated at an angle of 90° in the multi-window mode, the frame of the first window 191 may be again rotated at an angle of −90° to be maintained in a direction of A and the frame of the second window 192 may be rotated at an angle of −90° to be maintained in a direction of B, regardless of 180° rotation of the electronic device 100.

Figure 6D:
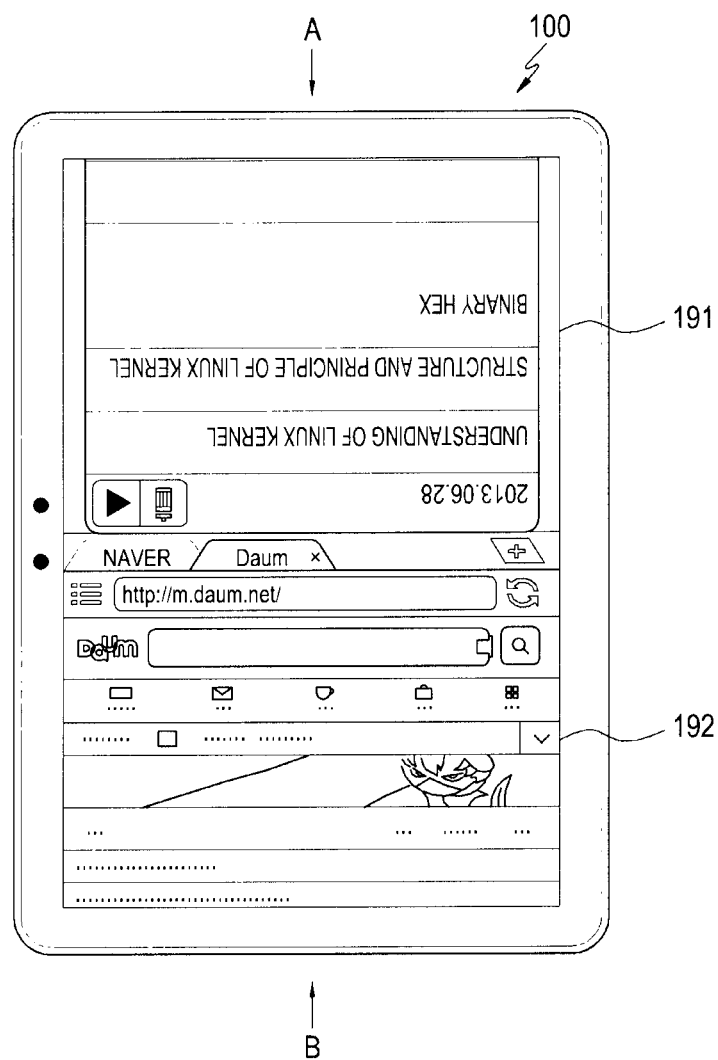

In addition, as shown in FIG. 6D, when the electronic device 100 shown in FIG. 6C is again rotated at an angle of 90° in the multi-window mode as shown in FIG. 6C, the frame of the first window 191 may be again rotated at an angle of −90° to be maintained in a direction of A and the frame of the second window 192 may be rotated at an angle of −90° to be maintained in a direction of B, regardless of 270° rotation of the electronic device 100.

As shown in FIGS. 6A, 6B, 6C and 6D, the present invention can provide appropriate position-related services to a plurality of users using multi-windows by maintaining frame rotation information respectively set for the multi-windows, regardless of rotation of the electronic device 100.

Hereinafter, the operations shown in FIGS. 6A through 6D will be described in detail with reference to FIGS. 7 and 8.

Figure 7:
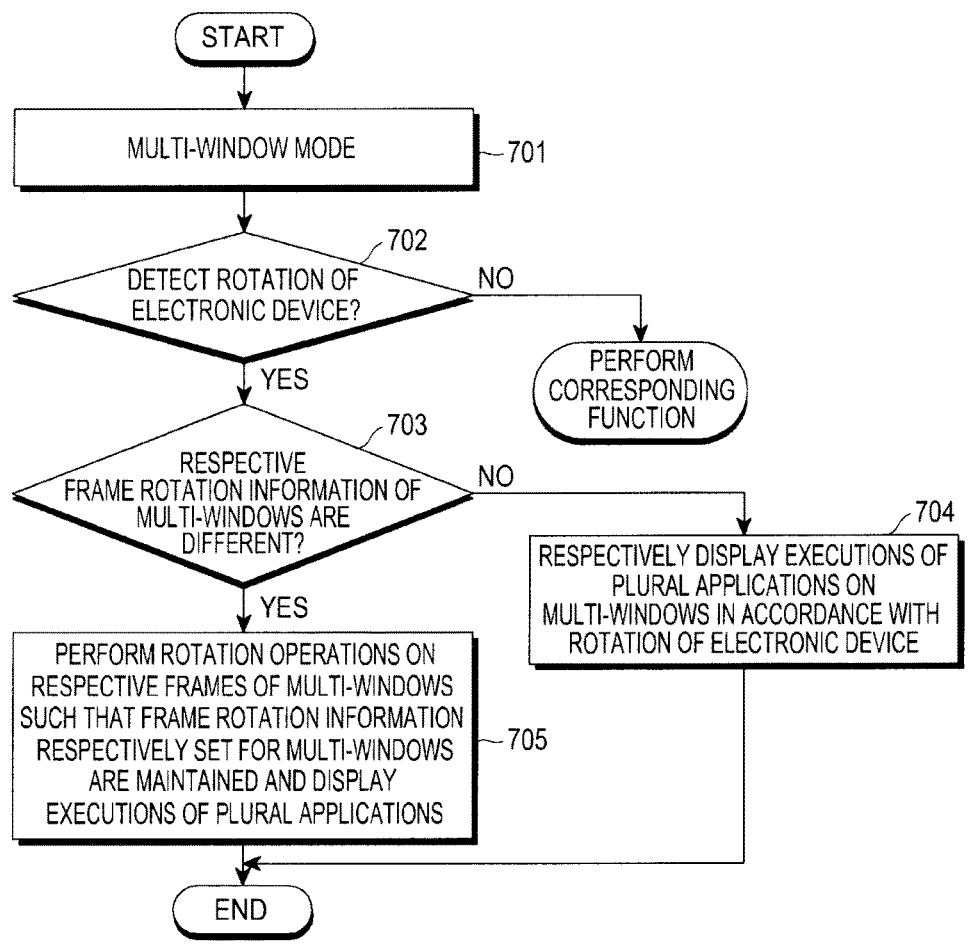
FIG. 7 is a flowchart illustrating an operation of controlling screen rotation of multi-windows depending on electronic device rotation in an electronic device according to various exemplary embodiments of the present invention.

FIG. 7 is a flowchart for illustrating an operation of controlling screen rotation of multi-windows depending on electronic device rotation in an electronic device according to a number of non-limiting exemplary embodiments of the present invention.

Hereinafter, a number of non-limiting exemplary embodiments of the present invention will be described also with reference to FIG. 1.

Referring now to FIG. 7, at (operation 701), in a multi-window mode it is determined at (operation 702) whether rotation of the electronic device 100 is detected. If the rotation of the electronic device 100 is detected, then at (operation 703) the controller 110 may determine whether respective frame rotation information of multi-windows are different from each other.

If the respective frame rotation information for the multi-windows are the same as each other, then at (operation 705) the controller 110 may control to rotate respective frames of the multi-windows in accordance with the rotation of the electronic device 100 and display executions of a plurality of applications on the multi-windows in a direction corresponding to the rotation of the electronic device 100.

However, if the respective frame rotation information of the multi-windows are different from each other, at (operation 705), the controller 110, regardless of the rotation of the electronic device 100, may control to rotate respective frames of the multi-windows such that the frame rotation information respectively set for the multi-windows are maintained and display the executions of the plurality of applications on the multi-windows of which the frames are rotated.

Figure 8:
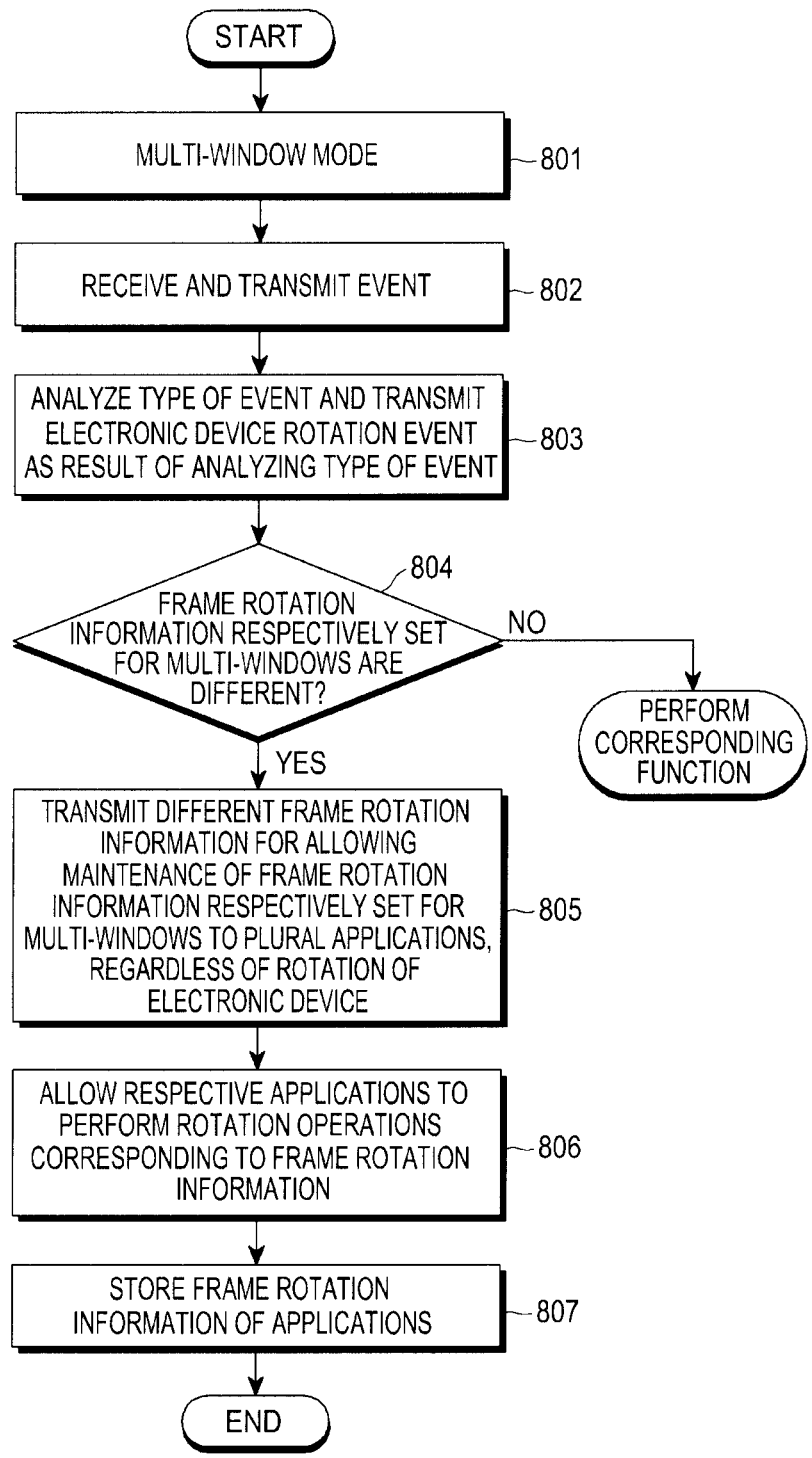
FIG. 8 is a flowchart illustrating an operation of controlling screen rotation of multi-windows depending on electronic device rotation in an OS framework of an electronic device according to various exemplary embodiments of the present invention.

FIG. 8 is a flowchart for illustrating an operation of controlling screen rotation of multi-windows depending on electronic device rotation in an OS framework of an electronic device according to a number of non-limiting exemplary embodiments of the present invention.

Hereinafter, a number of non-limiting exemplary embodiments of the present invention will also be described with reference to FIG. 2.

Referring now to FIG. 8, at (operation 801), in a multi-window mode, as the electronic device 100 is rotated, at (operation 802) the input manager 210a may receive an event and transmit the event to the event manager 210b. At (operation 803), the event manager 210b may analyze the type of event received from the input manager 210a and transmit an electronic device rotation event to the frame manager 210c as the analyzed result.

If the received event is an electronic device rotation event, then at (operation 804) the frame manager 210c determines whether frame rotation information respectively set for the multi-windows are different from each other by the respective frame rotation information of the multi-windows registered in the orientation manager 210d.

If it is determined in (operation 804) that the frame rotation information respectively set for the multi-windows are different from each other, then at (operation 805) the frame manager 210c identifies the frame rotation information respectively set for the multi-windows and a plurality of applications being respectively executed on the multi-windows. In (operation 805), the frame manager 210c may transmit different frame rotation information for allowing maintenance of the frame rotation information set for the multi-windows to a plurality of applications while the electronic device 100 is rotated.

In addition, (at operation 806), each of the corresponding applications receiving corresponding frame rotation information may perform a rotation operation by a rotation logic therein, and the orientation manager 210d may update respective changed frame rotation information of the plural applications.

Figure 9A:
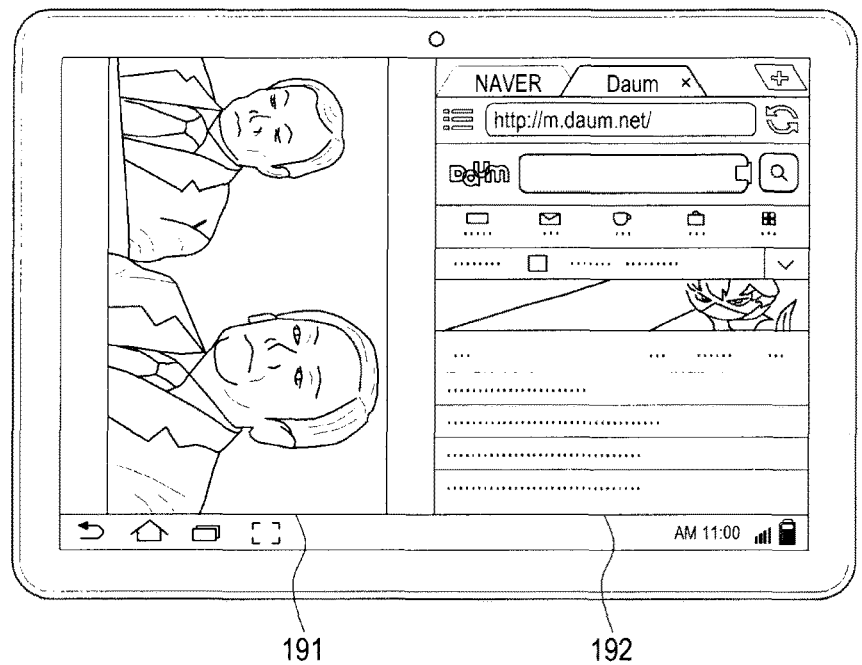
FIG. 9A and FIG. 9B are views for describing an operation of controlling a change of execution locations of applications being executed on multi-windows in an electronic device according to various exemplary embodiments of the present invention.
Figure 9B:
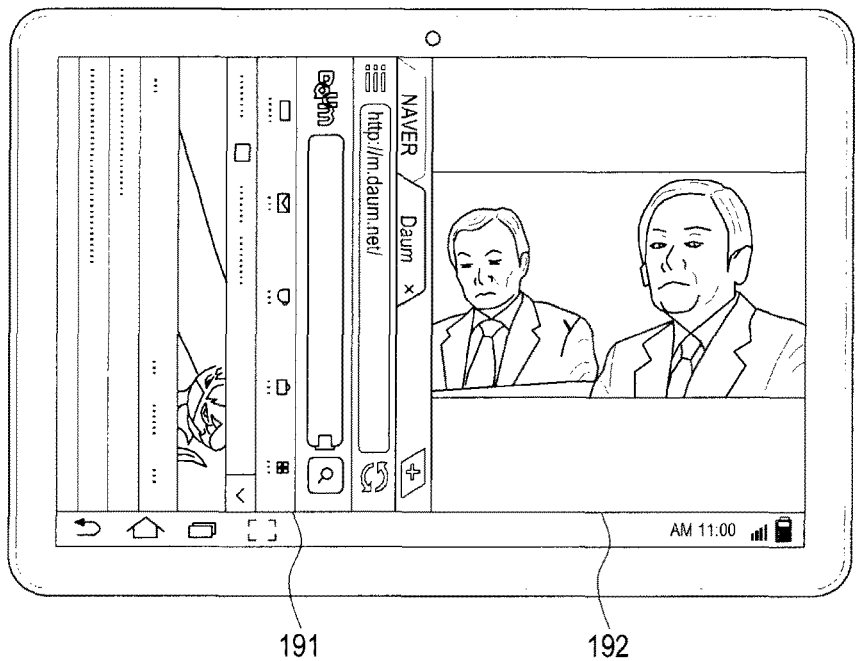

FIGS. 9A and 9B are views for illustrating operations of controlling a change of execution locations of applications on multi-windows in an electronic device according to a number of non-limiting exemplary embodiments of the present invention. In a number of non-limiting exemplary embodiments of the present invention, a touch screen that is divided into two windows on which executions of two applications are displayed in a multi-window mode is exemplified, but the number of windows divided in the multi-window mode is not limited.

FIG. 9A shows a multi-window mode in which a touch screen 190 is divided into a first window 191 and a second window 192, the first window 191 displaying an execution of a video application in a direction rotated at an angle of 90° and the second window 192 displaying an execution of an Internet application in a direction of 0°. When there is a request for changing an execution location of an application through a predetermined gesture in a multi-window mode as shown in FIG. 9A, the execution of the Internet application may be displayed on the first window 191 in a direction rotated at an angle of 90° in accordance with the frame rotation information of the first window 191 and the execution of the video application may be displayed on the second window 192 in a direction of 0° in accordance with the frame rotation information of the second window 192, as shown in FIG. 9B.

Hereinafter, the illustration of operations shown in FIGS. 9A and 9B will be described in detail with reference to FIGS. 10 and 11.

Figure 10:
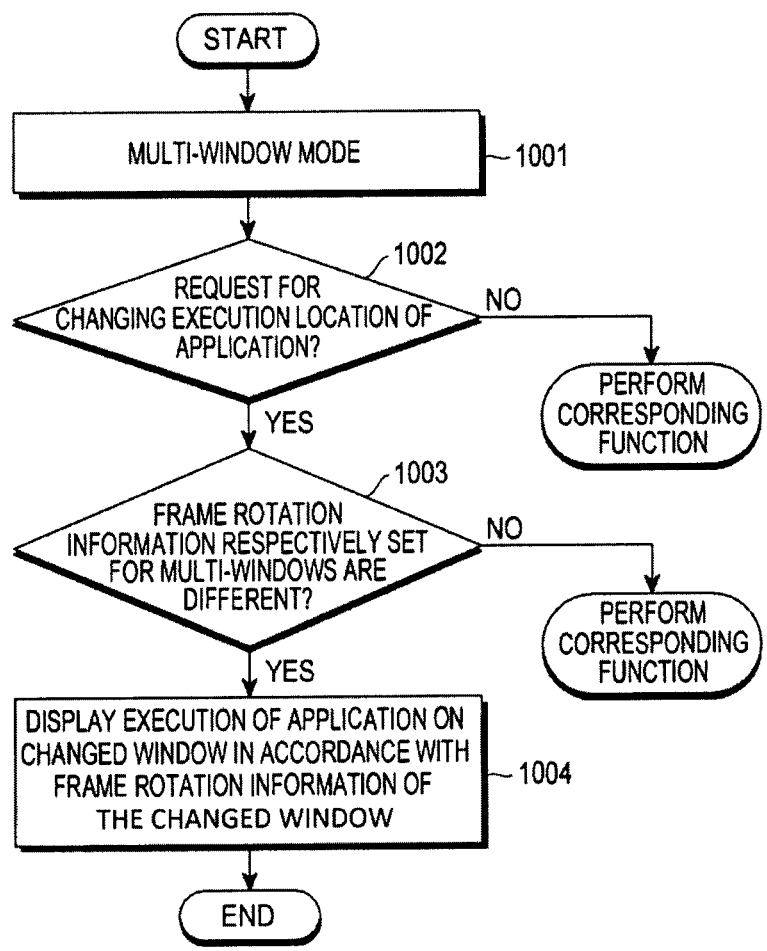
FIG. 10 is a flowchart illustrating an operation of controlling a change of execution locations of applications being executed on multi-windows in an electronic device according to various exemplary embodiments of the present invention.

FIG. 10 is a flowchart for illustrating an operation of controlling a change of execution locations of applications on multi-windows in an electronic device according to a number of non-limiting exemplary embodiments of the present invention.

Hereinafter, a number of non-limiting exemplary embodiments of the present invention will be described also with reference to FIG. 1.

Referring now to FIG. 10, at (operation 1001), in a multi-window mode, at (operation 1002) the controller 110 may determine whether there is a request for changing an execution location of a predetermined application among plural applications of which executions are being respectively displayed on multi-windows.

If it is determined at (operation 1002) that there is the request for changing an execution location of a predetermined application among the plural applications in operation 1002, then at (operation 1003) the controller 110 may determine whether frame rotation information respectively set for the multi-windows are different from each other.

If at (operation 1003) it is determined that the frame rotation information respectively set for the multi-windows are different from each other in, the controller 110 at (operation 1004) may control to display an execution of the predetermined application on a changed window on which the predetermined application is to be executed, in accordance with frame rotation information of the changed window.

Figure 11:
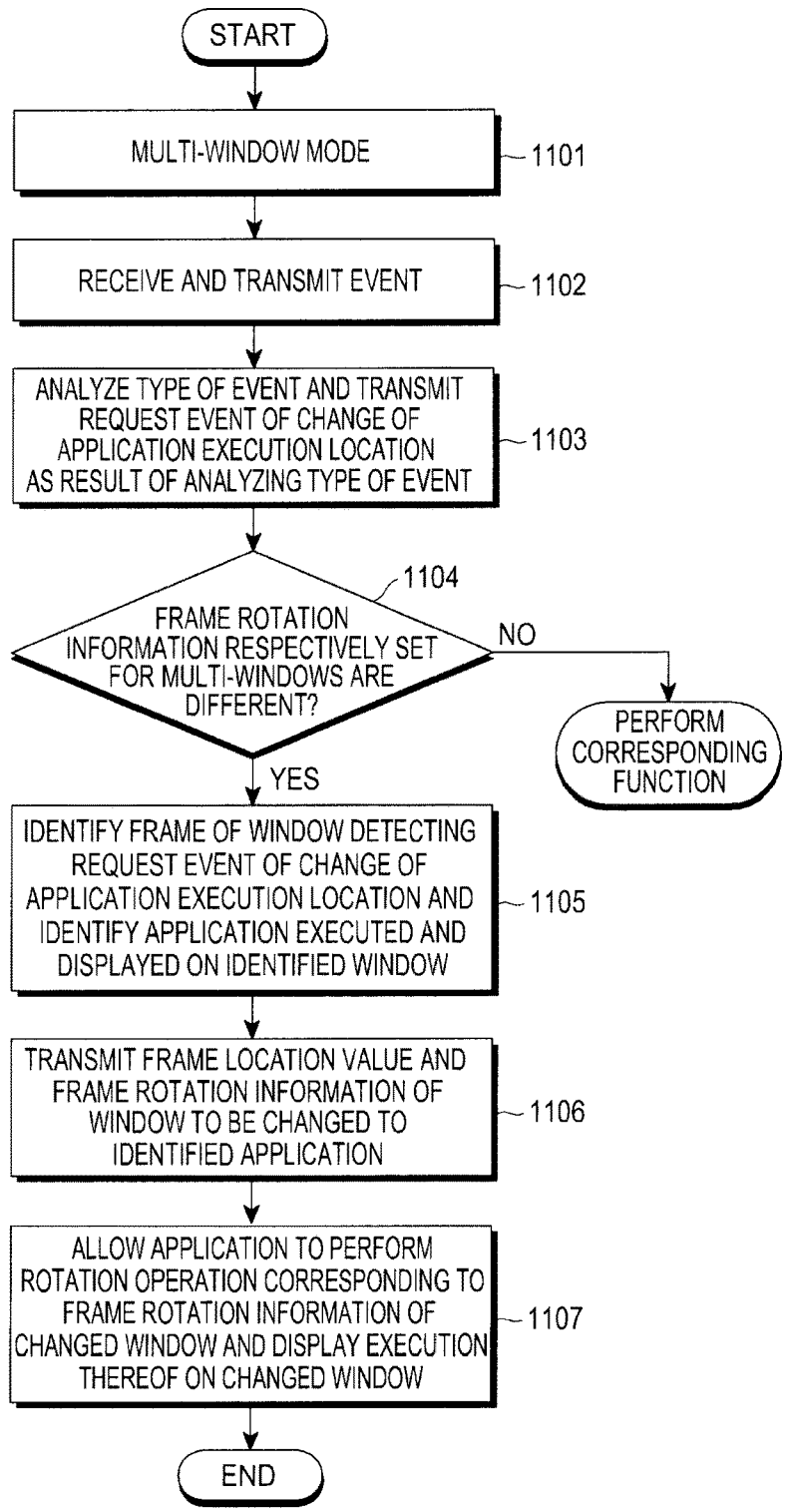
FIG. 11 is a flowchart illustrating an operation of controlling a change of execution locations of applications being executed on multi-windows in an OS framework of an electronic device according to various exemplary embodiments of the present invention.

FIG. 11 is a flowchart illustrating an operation of controlling a change of execution locations of applications on multi-windows in an OS framework of an electronic device according to a number of non-limiting exemplary embodiments of the present invention.

Hereinafter, a number of non-limiting exemplary embodiments of the present invention will also be described with reference to FIG. 2.

Referring now to FIG. 11, at (operation 1101) in a multi-window mode, as there is a request for changing application execution location, at (operation 1102) the input manager 210a may receive an event and transmit the event to the event manager 210b.

At (operation 1103), the event manager 210b may analyze the type of event received from the input manager 210a and transmit a request event of change of application execution location to the frame manager 210c as the analyzed result.

At (operation 1104), if the received event is the request event of change of application execution location, the frame manager 210c determines whether frame rotation information respectively set for the multi-windows are different from each other by respective frame rotation information of the multi-windows registered in the orientation manager 210d.

If in (operation 1104) it is determined that the frame rotation information respectively set for the multi-windows are different from each other, then at (operation 1105) the frame manager 210c may identify a frame of a window detecting the request event of change of application execution location and identify a predetermined application of which an execution is displayed on the identified window.

In addition, at (operation 1106), the frame manager 210c transmits a frame location value of another window corresponding to an execution location to be changed thereof and frame rotation information of another window to the identified application.

Finally, at (operation 1107), the identified application may allow performance of a frame rotation operation corresponding to frame rotation information of another window on another window through the received frame location value of another window.

Figure 12:
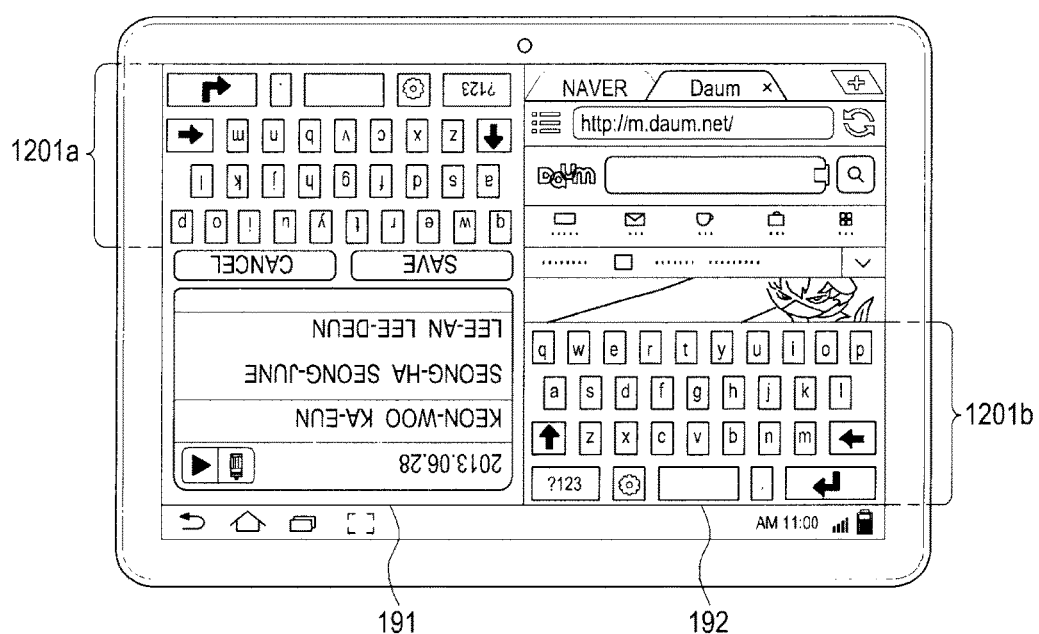
FIG. 12 is a view for describing an operation of controlling multi-inputs of multi-windows in an electronic device according to various exemplary embodiments of the present invention.

FIG. 12 is a view for describing an operation of controlling multi-inputs of multi-windows in an electronic device according to a number of non-limiting exemplary embodiments of the present invention. In a number of non-limiting exemplary embodiments of the present invention, a touch screen that is divided into two windows on which executions of two applications are displayed in a multi-window mode is exemplified, but the number of windows divided in the multi-window mode is not limited.

In a multi-window mode in which a touch screen 190 is divided into a first window 191 and a second window 192, the first window 191 displaying an execution of a memo application in a direction rotated at an angle of 180° and the second window 192 displaying an execution of an internet application in a direction of 0°, when there is a request for virtual input units for the memo application of the first window 191 and the Internet application of the second window 192, virtual input units 1201a and 1201b may be activated and displayed on the first window 191 and the second window 192, respectively.

While FIG. 12, and other drawings, for example, show different applications per window, an artisan understand and appreciates that it is within the scope of the present disclosure that, for example a game could be played between, for example two or more players, with windows for player 1, player 2, player 3 . . . at orientations by which they are sensed through presence detection. In addition, when plurality of input values are generated through key inputs of the virtual input units 1201a and 1201b respectively displayed on the first window 191 and the second window 192, an input value generated through a key input of the virtual input unit 1201a displayed on the first window may be provided to the memo application, and an input value generated through a key input of the virtual input unit 1201b displayed on the second window (192) may be provided to the Internet application.

As shown in FIG. 12, a single device can independently provide corresponding functions to a plurality of users respectively executing plural applications through inputs, for example, virtual key inputs. While two windows are shown, this is merely for illustrative purposes and there can be multiple windows for more than two users in different positions relative to the device.

Hereinafter, the operation shown in FIG. 12 will now be described in further detail with reference to FIGS. 13 and 14.

Figure 13:
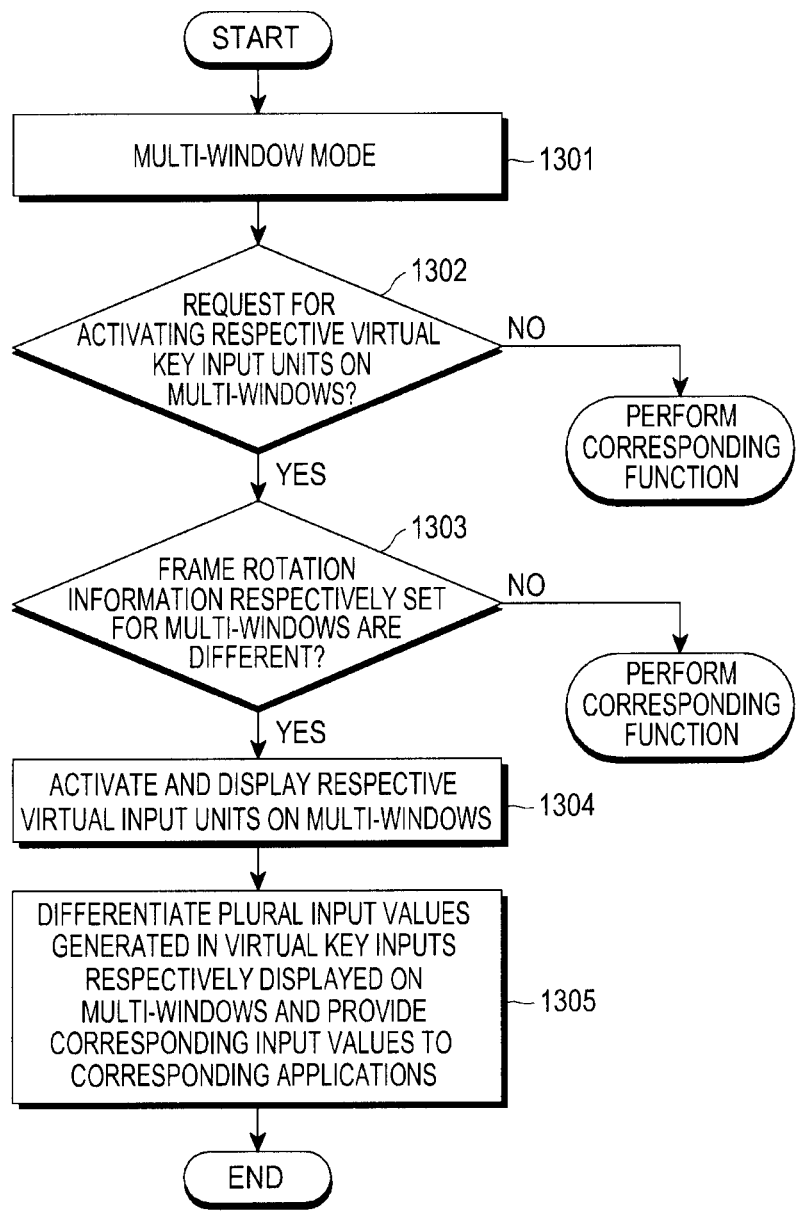
FIG. 13 is a flowchart illustrating an operation of controlling multi-inputs of multi-windows in an electronic device according to various exemplary embodiments of the present invention.

FIG. 13 is a flowchart for illustrating an operation of controlling multi-inputs of multi-windows in an electronic device according to a number of non-limiting exemplary embodiments of the present invention.

Hereinafter, a number of non-limiting exemplary embodiments of the present invention will be described also with reference to FIG. 1.

Referring now to FIG. 13, at (operation 1301) the device is in a multi-window mode, and at (operation 1302) it is determined whether there is a request for activating a virtual input unit on each of multi-windows.

If in (operation 1302) there is the request for activating respective virtual input units on the multi-windows, then at (operation 1303) controller 110 determines whether frame rotation information respectively set for the multi-windows are different from each other.

If at (operation 1303) it is determined that the frame rotation information respectively set for the multi-windows are different from each other, then in (operation 1304) the controller 110 controls to activate and display the requested virtual input units on the multi-windows, respectively.

In addition, at (operation 1305), when plural input values are generated through key inputs of the virtual input units respectively displayed on the multi-windows, the controller 110 may identify frames of windows in which differentiated plural input values are generated and provide corresponding input values to corresponding applications being executed on the identified windows.

Figure 14:
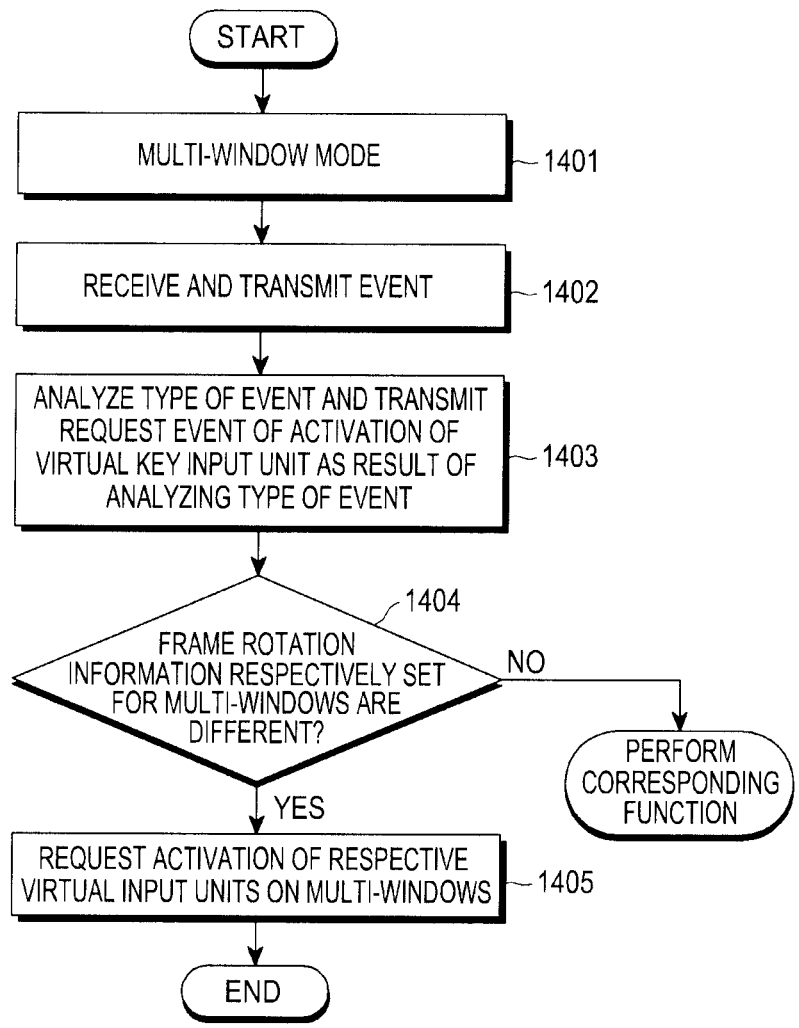
FIG. 14 and FIG. 15 are flowcharts illustrating an operation of controlling multi-inputs of multi-windows in an OS framework of an electronic device according to various exemplary embodiments of the present invention.
Figure 15:
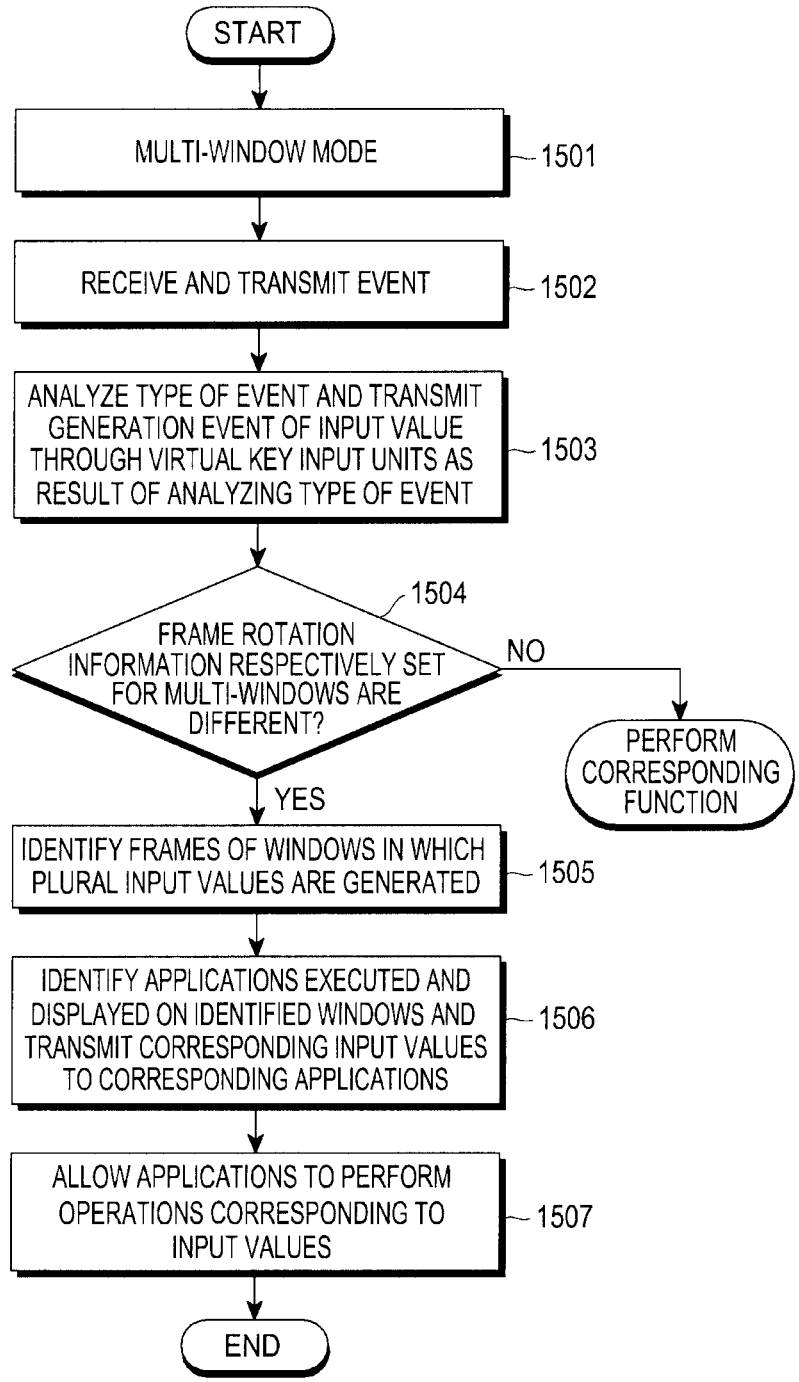

FIGS. 14 and 15 are flowcharts for illustrating an operation of controlling multi-inputs of multi-windows in an OS framework of an electronic device according to a number of non-limiting exemplary embodiments of the present invention.

Hereinafter, a number of non-limiting exemplary embodiments of the present invention will be described also with reference to FIG. 2.

Referring to FIG. 14 for illustrating the operation of respectively activating the virtual input units on the multi-windows, at operation (1401) the device is in a multi-window mode.

At (operation 1402), there is a request for activating the virtual input units, the input manager 210a may receive an event and transmit the event to the event manager 210b.

At (operation 1403), the event manager 210b may analyze the type of event received from the input manager 210a and transmit a request event of activation of virtual input unit to the frame manager 210c as the analyzed result.

At (operation 1404), when the received is the request event of activation of virtual input unit, the frame manager 210c determines whether frame rotation information respectively set for the multi-windows are different from each other by respective frame rotation information of the multi-windows registered in the orientation manager 210d.

If it is determined at (operation 1404) that the frame rotation information respectively set for the multi-windows are different from each other, then at (operation 1405) the frame manager 210c may request the input manager 210a to respectively activate the virtual input units on the multi-windows. When the virtual input units are respectively displayed on the multi-windows, the frame manager 210c may request the input manager 210a to activate and display the virtual input units in directions corresponding to the frame rotation information respectively set for the multi-windows.

In addition, referring to FIG. 15 for illustrating an operation of processing plural input values generated in the virtual input units respectively displayed on the multi-windows, in a multi-window mode (operation 1501), when the plural input values are generated through key inputs of the virtual input units respectively displayed on the multi-windows, at (operation 1502) the input manager 210a may receive an event and transmit the event to the event manager 210b.

At (operation 1503), the event manager 210b may analyze the type of event received from the input manager 210a and transmit a generation event of input value to the frame manager 210c as the analyzed result.

When the received event is the generation event of input value that plural input values are respectively generated through the virtual input units, at (operation 1504) the frame manager 210c determines whether frame rotation information respectively set for the multi-windows are different from each other by respective frame rotation information of the multi-windows registered in the orientation manager 210d.

If at (operation 1504), it is determined that the frame rotation information respectively set for the multi-windows are different from each other, the frame manager 210c at (operation 1505) identifies frames of windows in which the plural input values are respectively generated.

In addition, at (operation 1506) the frame manager 210c may identify applications of which executions are displayed on the identified windows, and transmit corresponding input values to corresponding applications.

Finally, at (operation 1507) the corresponding applications may allow performance of operations corresponding to the received corresponding input values.

Figure 16:
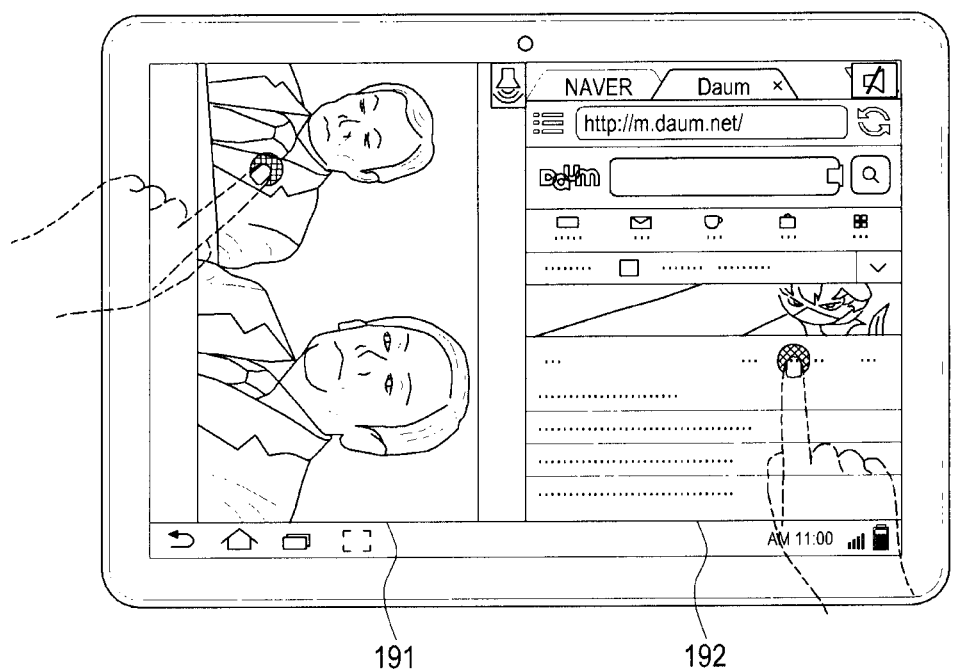
FIG. 16 is a view for describing an operation of controlling multi-touches of multi-windows in an electronic device according to various exemplary embodiments of the present invention.

FIG. 16 is a view for describing an operation of controlling multi-touches of multi-windows in an electronic device according to a number of non-limiting exemplary embodiments of the present invention. In a number of non-limiting exemplary embodiments of the present invention, a touch screen that is divided into two windows on which executions of two applications are displayed in a multi-window mode is exemplified, but the number of windows divided in the multi-window mode is not limited.

Referring to FIG. 16, in a multi-window mode in which a touch screen 190 is divided into a first window 191 and a second window 192, the first window 191 displaying an execution of a video application in a direction rotated at an angle of 90° and the second window 192 displaying an execution of an internet application in a direction of 0°, when multi-touches are respectively and simultaneously generated in the video application of the first window 191 and the Internet application of the second window 192, the video application may perform an operation corresponding to the touch generated on the first window 191 and the Internet application may perform an operation corresponding to the touch generated on the second window 192 at the same time.

As illustrated in FIG. 16, a single device can independently provide corresponding functions to a plurality of users respectively executing plural applications through the touches.

Hereinafter, the operation illustrated in FIG. 16 will be described in detail with reference to FIGS. 17 and 18.

Figure 17:
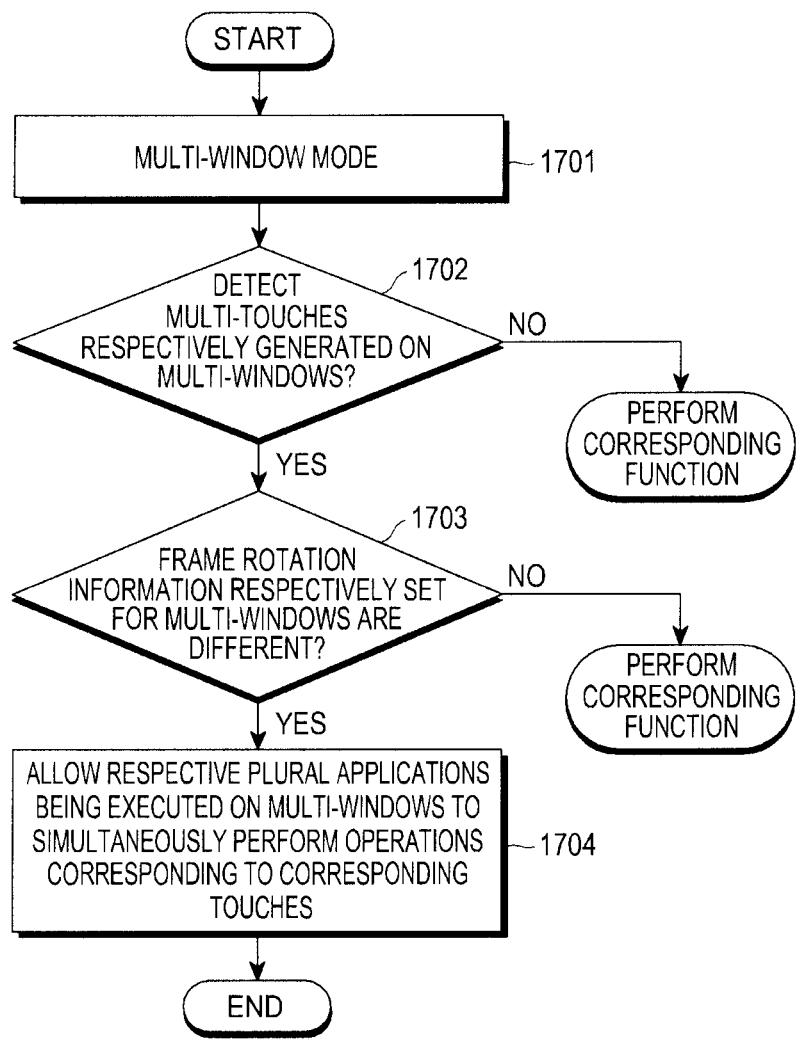
FIG. 17 is a flowchart illustrating an operation of controlling multi-touches of multi-windows in an electronic device according to various exemplary embodiments of the present invention.

FIG. 17 is a flowchart for illustrating an operation of controlling multi-touches of multi-windows in an electronic device according to a number of non-limiting exemplary embodiments of the present invention.

Hereinafter, a number of non-limiting exemplary embodiments of the present invention will be described also with reference to FIG. 1.

Referring to FIG. 17, at (operation 1701) in which the device is in a multi-window mode, at (operation 1702) the controller 110 determines whether multi-touches respectively and simultaneously generated on the multi-windows are detected.

If the multi-touches respectively and simultaneously generated on the multi-windows are detected in (operation 1702), at (operation 1703) the controller 110 may determines whether frame rotation information respectively set for the multi-windows are different from each other.

If it is determined in operation (1703) that the frame rotation information respectively set for the multi-windows are different from each other, the controller 110 at (operation 1704) may identify respective input coordinates at which the multi-touches are generated and frames of window on which the multi-touches are generated, and may control corresponding applications to perform operations corresponding to the corresponding input coordinates.

Figure 18:
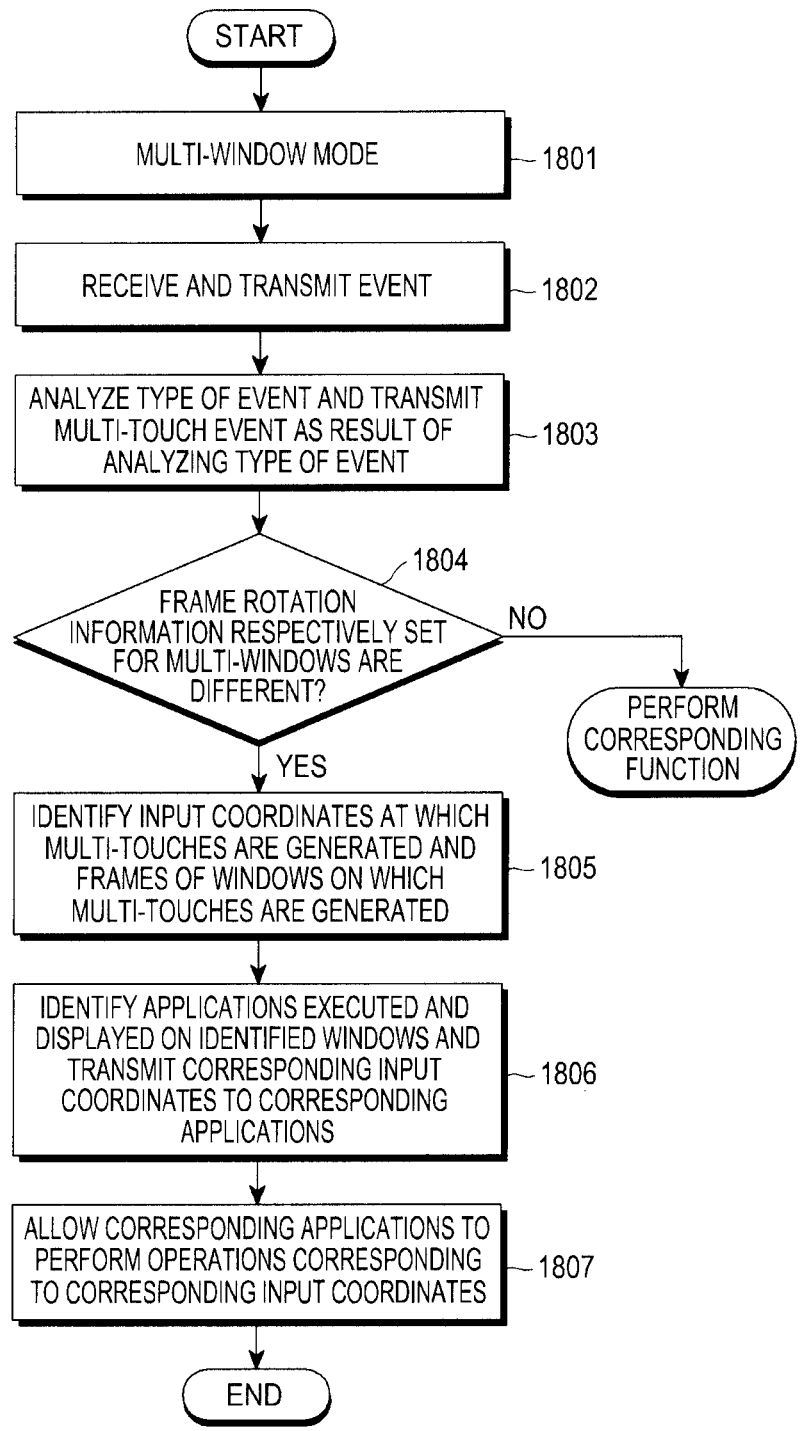
FIG. 18 is a flowchart illustrating an operation of controlling multi-touches of multi-windows in an OS framework of an electronic device according to various exemplary embodiments of the present invention.

FIG. 18 is a flowchart for illustrating an operation of controlling multi-touches of multi-windows in an OS framework of an electronic device according to a number of non-limiting exemplary embodiments of the present invention.

Hereinafter, a number of non-limiting exemplary embodiments of the present invention will be described also with reference to FIG. 2.

Referring to FIG. 18, in a multi-window mode (operation 1801), as multi-touches are respectively and simultaneously generated on frames of multi-windows, at (operation 1802) the input manager 210a may receive an event and transmit the event to the event manager 210b.

At (operation 1803), the event manager 210b may analyze the type of event received from the input manager 210a and transmit a multi-touch event that multi-touches are respectively and simultaneously generated on the frames of the multi-windows to the frame manager 210c as the analyzed result.

If the received event is the event of activation of virtual input unit, at (operation 1804) the frame manager 210c determines whether frame rotation information respectively set for the multi-windows are different from each other by respective frame rotation information of the multi-windows registered in the orientation manager 210d.

If at (operation 1804), it is determined that the frame rotation information respectively set for the multi-windows are different from each other in operation 1804, the frame manager 210c at (operation 1805) may identify respective input coordinates at which the multi-touches are generated and respective frames of the windows on which the multi-touches are generated. In addition, the frame manager 210c at (operation 1806) may identify applications being executed on the identified windows, and transmit corresponding input coordinate values to corresponding applications.

In addition, at (operation 1807) the corresponding applications are allowed to perform operations corresponding to the corresponding input coordinate values, and thus, simultaneously perform operations corresponding to the multi-touches respectively generated on the multi-windows.

Alternatively, when receiving the input coordinate values of the multi-touches in order, the input manager 210a gives a predetermined delay value to the input coordinate values in the order of reception and thus an OS of the electronic device based on time-division scheduling can process individual inputs while scheduling respective applications.

Figure 19:
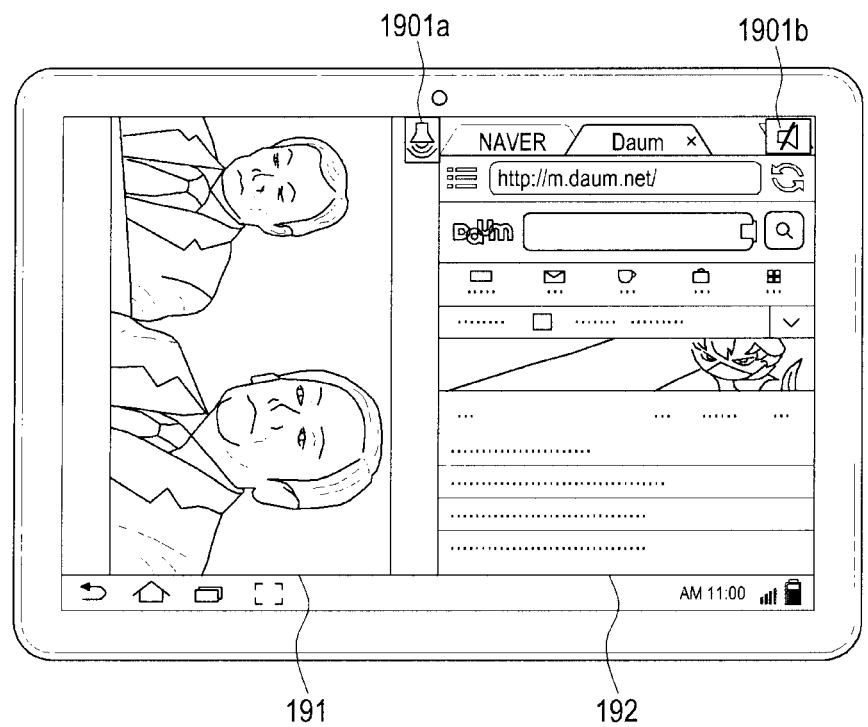
FIG. 19 is a view for describing an operation of controlling an output of multi-audio data of multi-windows in an electronic device according to various exemplary embodiments of the present invention.

FIG. 19 is a view for describing an operation of controlling an output of multi-audio data of multi-windows in an electronic device according to a number of non-limiting exemplary embodiments of the present invention. In a number of non-limiting exemplary embodiments of the present invention, a touch screen that is divided into two windows on which executions of two applications are displayed in a multi-window mode is exemplified, but the number of windows divided in the multi-window mode is not limited.

In a multi-window mode where a touch screen 190 is divided into a first window 191 and a second window 192, the first window 191 displaying an execution of a video application in a direction rotated at an angle of 90° and the second window 192 displaying an execution of an internet application in a direction of 0°, when audio data are simultaneously outputted from the video application and the internet application, audio data of only the video application having higher priority may be outputted, as shown in FIG. 9. In addition, as shown in FIG. 19, an output icon 1901a of informing that audio data are being outputted is displayed on the first window 191 and a non-output icon 1901b of informing that audio data are not being outputted is displayed on the second window 192.

As illustrated in FIG. 19, when audio data are simultaneously outputted from the plurality of applications in the multi-window mode where the plural applications are simultaneously executed, the audio data can be prevented from being mixed and outputted.

Hereinafter, the exemplary operation illustrated in FIG. 19 will now be described in detail with reference to FIG. 20.

Figure 20:
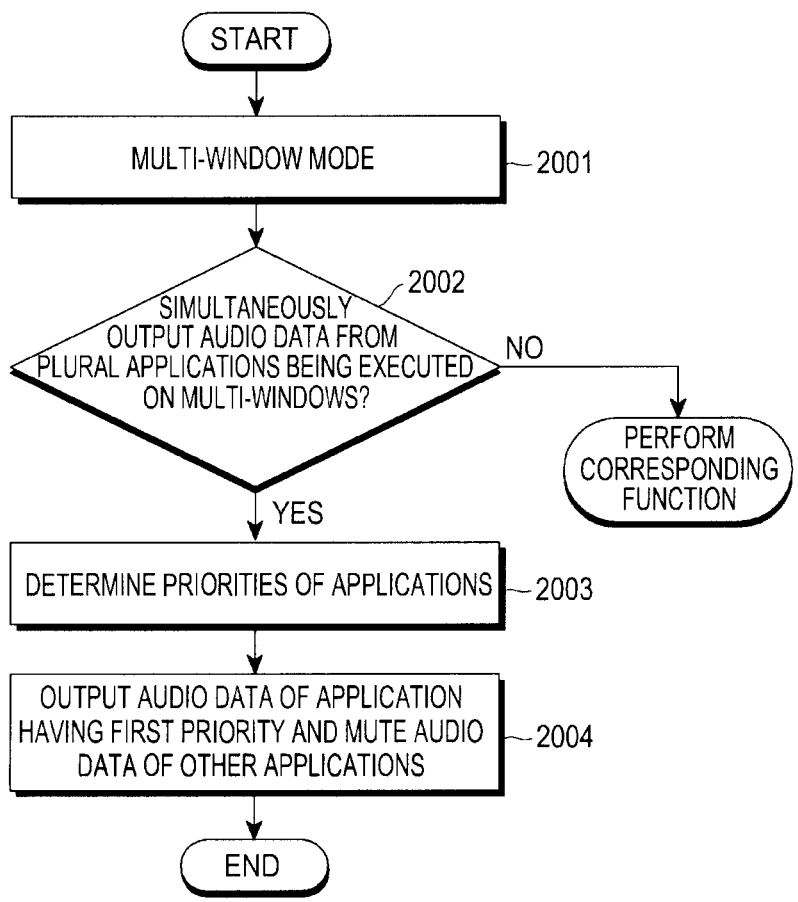
FIG. 20 is a flowchart illustrating an operation of controlling an output of multi-audio data of multi-windows in an electronic device according to various exemplary embodiments of the present invention.

FIG. 20 is a flowchart for illustrating an operation of controlling an output of multi-audio data on multi-windows in an electronic device according to a number of non-limiting exemplary embodiments of the present invention.

Hereinafter, a number of non-limiting exemplary embodiments of the present invention will be described also with reference to FIG. 1.

Referring to FIG. 20, at (operation 2001) with the device in a multi-window mode, the controller 110 at (operation 2002) determines whether audio data are simultaneously outputted from respective plural applications being executed on the multi-windows.

If it is determined at (operation 2002) that the audio data are simultaneously outputted from respective plural applications, the controller 110 at (operation 2003) determines priorities of the plural applications. The priorities of the plural applications may be predetermined automatically or manually.

If the priorities of the plural applications are determined, the controller 110 at (operation 2004) may output audio data generated in only the application having first priority among the plural applications and may mute audio data generated in the other applications.

In addition, when the earphone is inserted into the electronic device 100, the audio data generated in the other applications may be outputted through the earphone.

Figure 21:
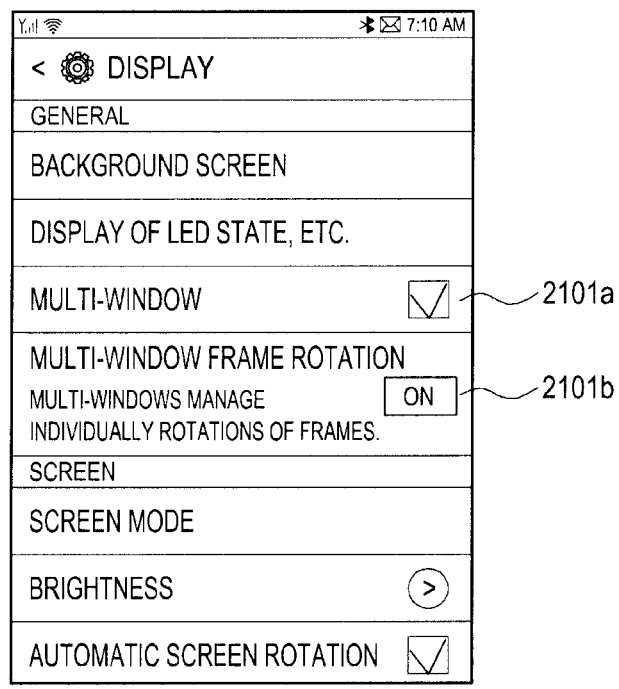
FIG. 21 shows a configuration menu for selecting "Multi-Window Frame Rotation" in an electronic device according to various exemplary embodiments of the present invention.

FIG. 21 shows a configuration menu for selecting "Multi-Window Frame Rotation" in an electronic device according to a number of non-limiting exemplary embodiments of the present invention.

As shown in FIG. 21, the item "Multi-Window" may be selected from a configuration menu for display 9 (1201a), and then the item "Multi-Window Frame Rotation" may be selectively activated or deactivated (2101b). When the item "Multi-Window Frame Rotation" is selectively activated, there may be individual frames through gestures for frame rotation.

The electronic device and the method for controlling multi-windows in an electronic device according to a number of non-limiting exemplary embodiments of the present invention can be embodied as a code readable by a computer on a recording medium readable by the computer. The recording medium readable by a computer includes all types of recording devices storing data readable by a computer system. Examples of the recording media are a ROM, a RAM, an optical disc, a magnetic tape, a floppy disc, a non-volatile memory, and the like, and includes also ones embodied in a carrier wave type (for example, transmission through Internet). In addition, the recording media readable by a computer are distributed in a computer system connected to a network, so that codes readable by the computers can be stored in the recording media and can be implemented in a distribution manner.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" comprises circuitry in the claimed disclosure that is configured for operation by the execution of machine executable code. Under the broadest reasonable interpretation, the appended claims constitute statutory subject matter in compliance with 35 U.S.C. § 101.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

As set forth above, in the electronic device and the method for controlling multi-windows of the electronic device according to a number of non-limiting exemplary embodiments of the present invention, a plurality of users can easily and conveniently use desired functions in a single electronic device by individually controlling screens, inputs, and voices of the multi-windows.

While the present invention has been shown and described with reference to certain embodiments thereof, it will be understood by those skilled in the art that a number of non-limiting changes in form and details may be made therein without departing from the spirit and scope of the present invention as defined by the appended claims.

What is claimed is:

1. An electronic device, comprising:
a display unit; and
a controller operatively coupled to the display unit, configured to:

display, on the display unit, a plurality of windows corresponding to a plurality of applications, wherein the plurality of windows includes a first window displaying a first image associated with a first application in a first frame and a second window displaying a second image associated with a second application in a second frame, the plurality of windows are displayed concurrently, each one of the plurality of windows is displayed in a different portion of the display unit, and when a rotation gesture on the first window is detected, rotate the first frame to a longitudinal direction or a perpendicular direction corresponding to the rotation gesture while maintaining direction of the second image of the second window and while a location of the first window is unchanged.

2. The electronic device of claim 1, further comprising:
a memory; and
the controller is operatively coupled to the memory and configured to execute an input manager, an event manager, a frame manager, wherein:
the input manager receives an event and transmits the event to the event manager,
the event manager transmits, to the frame manager, a request for change of an execution location of an application in the plurality of applications from the first window to the second window, and
the frame manager detects whether directions corresponding to frame rotation information corresponding to the first window and the second window, respectively, are different from each other, and transmits an identifier of the second window to the application in response to detecting that the directions corresponding to frame rotation information are different.

3. The electronic device of claim 1, wherein the controller detects a request for changing an execution location of the first application from the first window to the second window, wherein the request is detected when the first image is displayed in the first window, when frame rotation information associated with the first window and the second window respectively are different from each other, the controller moves the first image from the first window in accordance with frame rotation information that is associated with the second window.

4. The electronic device of claim 1, wherein in response to a request for activating respective virtual input units on the plurality of windows, when frame rotation information of the plurality of windows are different from each other, the controller is configured to activate and display the respective virtual input units on the plurality of windows, and
when a plurality of input values are generated through the respective virtual input units, the controller is configured to identify respective windows in which the plurality of input values are generated and provide corresponding input values to applications that are executed on the respective windows.

5. The electronic device of claim 1, wherein when a plurality of touches are concurrently performed on the plurality of windows, and frame rotation information of the plurality of windows are different from each other, the controller is further configured to identify respective input coordinates of the plurality of touches and frames of windows on which the plurality of touches are respectively performed, thereby allowing the applications corresponding to the plurality of windows to perform operations based on the respective input coordinates.

6. The electronic device of claim 1, wherein the controller is further configured to, when audio data are concurrently outputted from the plurality of applications, and frame rotation information of the plurality of windows are different from each other, output audio data that is generated by only one of the plurality of applications that is associated with a first priority among the plurality of applications.

7. The electronic device of claim 1, wherein the controller is configured to execute:
an input manager for receiving an event generated in the electronic device;
an event manager for identifying a type of the event;
a frame manager for receiving the event from the event manager and identifying a window corresponding to the event, transmitting the event to an application corresponding to the window; and
an orientation manager for registering respective frame rotation information of the plurality of windows and frame rotation information of the electronic device when the event is a rotation event.

8. An electronic device, comprising:
a display unit displaying a split screen including at least two windows, the at least two windows are oriented in opposite directions towards at least two concurrent users; and
a controller operatively coupled to the display unit, configured to:
receive inputs from the at least two concurrent users of the electronic device, each user entering input on at least one of the at least two windows,
identify frame rotation information for each one of the at least two windows, the frame rotation information indicating orientations of the at least two windows with respect the at least two concurrent users, and
when a rotation of the electronic device is detected, automatically rotate the at least two windows based on the identified frame rotation information such that orientations of the at least two windows with respect to the concurrent users are maintained.

9. A method of an electronic device comprising:
displaying, by a processor on a display coupled to the processor, a plurality of windows corresponding to a plurality of applications, wherein the plurality of windows includes a first window displaying a first image associated with a first application in a first frame and a second window displaying a second image associated with a second application in a second frame, the plurality of windows are displayed concurrently, each one of the plurality of windows is displayed in a different portion of a display unit; and
when a rotation gesture on the first window is detected, rotating the first frame to a longitudinal direction or a perpendicular direction corresponding to the rotation gesture while maintaining direction of the second image of the second window and while a location of the first window is unchanged.

10. The method of claim 9, further comprising:
detecting a request for changing an execution location of the first application from the first window to the second window, wherein the request is detected when the first image is displayed in the first window; and
when frame rotation information associated with the first window and the second window respectively are different from each other, moving the first image from the first window to the second window in accordance with frame rotation information that is associated with the second window.

11. The method of claim 9, further comprising:
in response to a request for activating virtual input units on the plurality of windows, determining whether frame rotation information of the plurality of windows are different from each other;
when the frame rotation information of the plurality of windows are different from each other, activating and displaying the virtual input units on the plurality of windows; and
if a plurality of input values are generated through the virtual input units, identifying windows in which the plurality of input values are generated, and providing corresponding input values to applications that are executed on the windows.

12. The method of claim 9, further comprising:
in response to a plurality of touches that are concurrently generated on the plurality of windows, determining whether frame rotation information of the plurality of windows are different from each other;
when the frame rotation information of the plurality of windows are different from each other, identifying respective input coordinates of the plurality of touches and respective windows in which the plurality of touches are performed; and
providing the respective input coordinates to the applications that are executed on the respective windows.

13. The method of claim 9, further comprising:
in response to audio data are concurrently outputted from the plurality of applications, detecting whether frame rotation information of the plurality of windows are different from each other; and
when the frame rotation information of the plurality of windows are different from each other, outputting only audio data that is generated by an application having a first priority among the plurality of applications.

14. The method of claim 9, further comprising:
receiving by an input manager an event generated in an electronic device;
identifying, by an event manager, a type of the event;
identifying by a frame manager a window corresponding to the event, and transmitting the event to an application that is executed on the window; and
performing an operation corresponding to the event, by the application, the type of the event including an electronic device rotation event, a request event of change of application execution location, a request event of activation of virtual input unit, a generation event of input value inputted through virtual input unit, and a multi-touch event.

15. The method of claim 9, further comprising:
receiving, by an input manager executing on a processor, an event;
identifying, by an event manager executing on the processor, a type of the event received from the input manager and transmitting to a frame manager a request for change of an execution location of an application in the plurality of applications from the first window to the second window;
detecting, by the frame manager executing on the processor, whether directions corresponding to frame rotation information corresponding to the first window and the second window, respectively, are different from each other; and
transmitting an identifier of the second window to the application in response to detecting that the directions corresponding to the frame rotation information are different.

16. A method comprising:
displaying, by a display, a split screen including at least two windows, the at least two windows are oriented in opposite directions towards at least two concurrent users;
receiving, by a processor, inputs from the at least two concurrent users of an electronic device, each user entering input on at least one of the at least two windows;
identifying, by the processor, frame rotation information for each one of the at least two windows, the frame rotation information indicating orientations of the at least two windows with respect the at least two concurrent users; and
when a rotation of the electronic device is detected, automatically rotating the at least two windows based on the identified frame rotation information such that orientations of the at least two windows with respect to the concurrent users are maintained.

* * * * *